US012382467B2

(12) United States Patent
Abotabl et al.

(10) Patent No.: US 12,382,467 B2
(45) Date of Patent: Aug. 5, 2025

(54) AVAILABLE SLOT DETERMINATION FOR APERIODIC SOUNDING REFERENCE SIGNAL TRIGGERING IN FULL-DUPLEX SYSTEM

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 344 days.

(21) Appl. No.: 17/815,842

(22) Filed: Jul. 28, 2022

(65) Prior Publication Data

US 2024/0049238 A1 Feb. 8, 2024

(51) Int. Cl.
| | |
|---|---|
| H04W 72/04 | (2023.01) |
| H04L 5/00 | (2006.01) |
| H04L 5/14 | (2006.01) |
| H04W 24/08 | (2009.01) |
| H04W 72/0446 | (2023.01) |
| H04W 72/23 | (2023.01) |

(52) U.S. Cl.
CPC ........... *H04W 72/23* (2023.01); *H04L 5/0051* (2013.01); *H04L 5/14* (2013.01); *H04W 24/08* (2013.01); *H04W 72/0446* (2013.01)

(58) Field of Classification Search
CPC ........... H04W 72/042; H04W 72/0446; H04W 72/23; H04W 24/08; H04L 5/0051; H04L 5/14; H04L 5/0048; H04L 5/0053; H04L 5/0094; H04L 5/1469
See application file for complete search history.

(56) References Cited

U.S. PATENT DOCUMENTS

| | | | | |
|---|---|---|---|---|
| 11,924,136 | B2 * | 3/2024 | Go | H04L 5/0062 |
| 2021/0297226 | A1 * | 9/2021 | Abotabl | H04L 5/1461 |
| 2021/0409178 | A1 * | 12/2021 | Faxér et al. | H04L 5/0053 |
| 2022/0052882 | A1 * | 2/2022 | Wang | H04L 5/1423 |
| 2022/0201657 | A1 * | 6/2022 | Wang | H04L 5/0091 |
| 2023/0087280 | A1 * | 3/2023 | Zhang | H04L 5/0035 370/329 |
| 2023/0239843 | A1 * | 7/2023 | Liu | H04L 5/0096 370/329 |
| 2023/0300806 | A1 * | 9/2023 | Haghighat | H04L 5/0053 370/329 |

FOREIGN PATENT DOCUMENTS

| | | | | |
|---|---|---|---|---|
| EP | 4444001 A1 * | 10/2024 | | H04W 72/04 |
| WO | WO-2020146512 A1 * | 7/2020 | | H04B 7/2656 |

OTHER PUBLICATIONS

WO 2020/146512 (Year: 2020).*
EP 4444001 A1 (Year: 2021).*

* cited by examiner

Primary Examiner — Rasheed Gidado
(74) Attorney, Agent, or Firm — Patterson + Sheridan, L.L.P.

(57) ABSTRACT

Certain aspects of the present disclosure provide techniques for available slot determination for aperiodic sounding reference signal (A-SRS) transmission in full-duplex (FD) systems. A method for wireless communications includes receiving, in a first slot, downlink control information (DCI) triggering an A-SRS transmission. The method includes determining a second slot to transmit the A-SRS based, at least in part, on a slot configuration indicating one or more slots as FD slots.

20 Claims, 25 Drawing Sheets

600

| DCI Codepoint | t-value |
|---|---|
| 00 | T0 = 0 |
| 01 | T1 = 1 |
| 10 | T2 = 2 |
| 11 | T3 = 3 |

*FIG. 6*

AVAILABLE SLOT DETERMINATION FOR APERIODIC SOUNDING REFERENCE SIGNAL TRIGGERING IN FULL-DUPLEX SYSTEM

BACKGROUND

Field of the Disclosure

Aspects of the present disclosure relate to wireless communications, and more particularly, to techniques for aperiodic sounding reference signal (A-SRS) triggering.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communication by a user equipment (UE). The method includes receiving, in a first slot, downlink control information (DCI) triggering an A-SRS transmission. The method includes determining a second slot to transmit the A-SRS based, at least in part, on a slot configuration indicating one or more slots as full-duplex (FD) slots.

Other aspects provide: an apparatus operable, configured, or otherwise adapted to perform the aforementioned methods as well as those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIG. 6 is a table depicting example downlink control information DCI codepoints mapped to A-SRS slot offsets.

DETAILED DESCRIPTION

Figure 1:
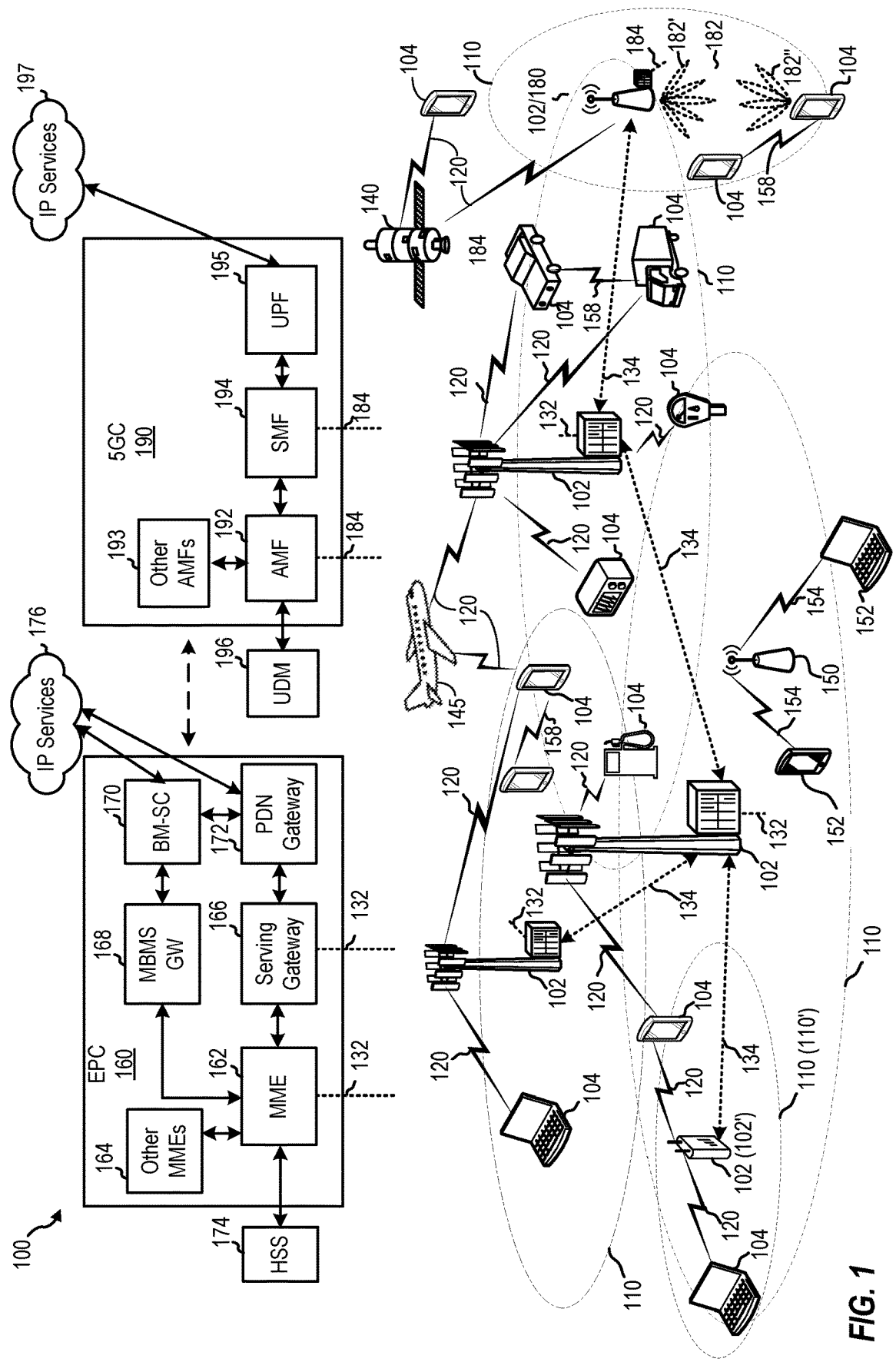
FIG. 1 depicts an example wireless communications network.

Aspects of the present disclosure provide apparatuses, methods, processing systems, and computer-readable mediums for available slot determination for A-SRS triggering in FD systems.

When an A-SRS triggering DCI is received in a slot, n, A-SRS transmission is transmitted after an offset number of available slots, t, from a reference slot (e.g., in the t+1th slot). The reference slot is a slot, n+k, that is an offset number of slots, k, from the slot, n, in which the A-SRS triggering DCI is received. The available slots includes uplink and flexible slots, whereas downlink slots are not counted towards the offset number of available slots.

Certain systems, however, support FD operation. With FD operation, one or more slots may be configured as FD slots. A FD slot is configured for both uplink and downlink communication. For example, in subband full-duplex (SBFD), an SBFD slot has both uplink and downlink subbands. Accordingly, techniques are needed for determining a reference slot, an available slot, and a slot for A-SRS transmission in FD systems.

According to certain aspects, a FD slot can be the reference slot. In some examples, the slot, n+k, may be determined as the reference slot regardless whether the slot is an FD slot or a half-duplex (HD) slot. In some examples, the slot, n, in which the A-SRS triggering DCI is received may be determined as the reference slot regardless whether the slot is an FD slot or a HD slot.

According to certain aspects, a FD slot cannot be the reference slot. In some examples, the slot, n+k, may be not determined as the reference slot when the slot is an FD slot. Instead, the first non-FD slot occurring after the slot, n+k, may be determined as the reference slot. In some examples, the slot, n, in which the A-SRS triggering DCI is received may be not determined as the reference slot when the slot is an FD slot. Instead, the first non-FD slot occurring after the slot, n, may be determined as the reference slot.

According to certain aspects, the availability of a given slot is based on the uplink bandwidth configured in the slot. In some examples, a slot is determined to be available (e.g., counted towards the t available slots from the reference slot) only when all SRS resources of the triggered SRS resource set fit within the uplink bandwidth of the slot. Otherwise, the slot is determine to unavailable (e.g., not counted towards the t available slots from the reference slot). In some examples, the slot is determined to be available when at least one of the SRS resources of the triggered SRS resource set fit within the uplink bandwidth of the slot. In some examples, a FD slot is always considered available and a new SRS sequence is generated, the SRS sequence is truncated, and/or a separate SRS resource configuration is configured for FD. In some examples, the slot is considered available if a threshold amount of the triggered SRS resource set fits in the uplink bandwidth of the slot. According to certain aspects, an FD slot is considered as available regardless of the uplink bandwidth configured in the slot.

According to certain aspects, the A-SRS transmission is dropped if the slot pointed to by the t-value (e.g., the t+1th available slot) does not fit all of the SRS resources of the triggered SRS resource set in the uplink bandwidth of the slot. According to certain aspects, the A-SRS transmission is transmitted in a next available uplink slot if the slot pointed to by the t-value (e.g., the t+1th available slot) is a FD slot.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
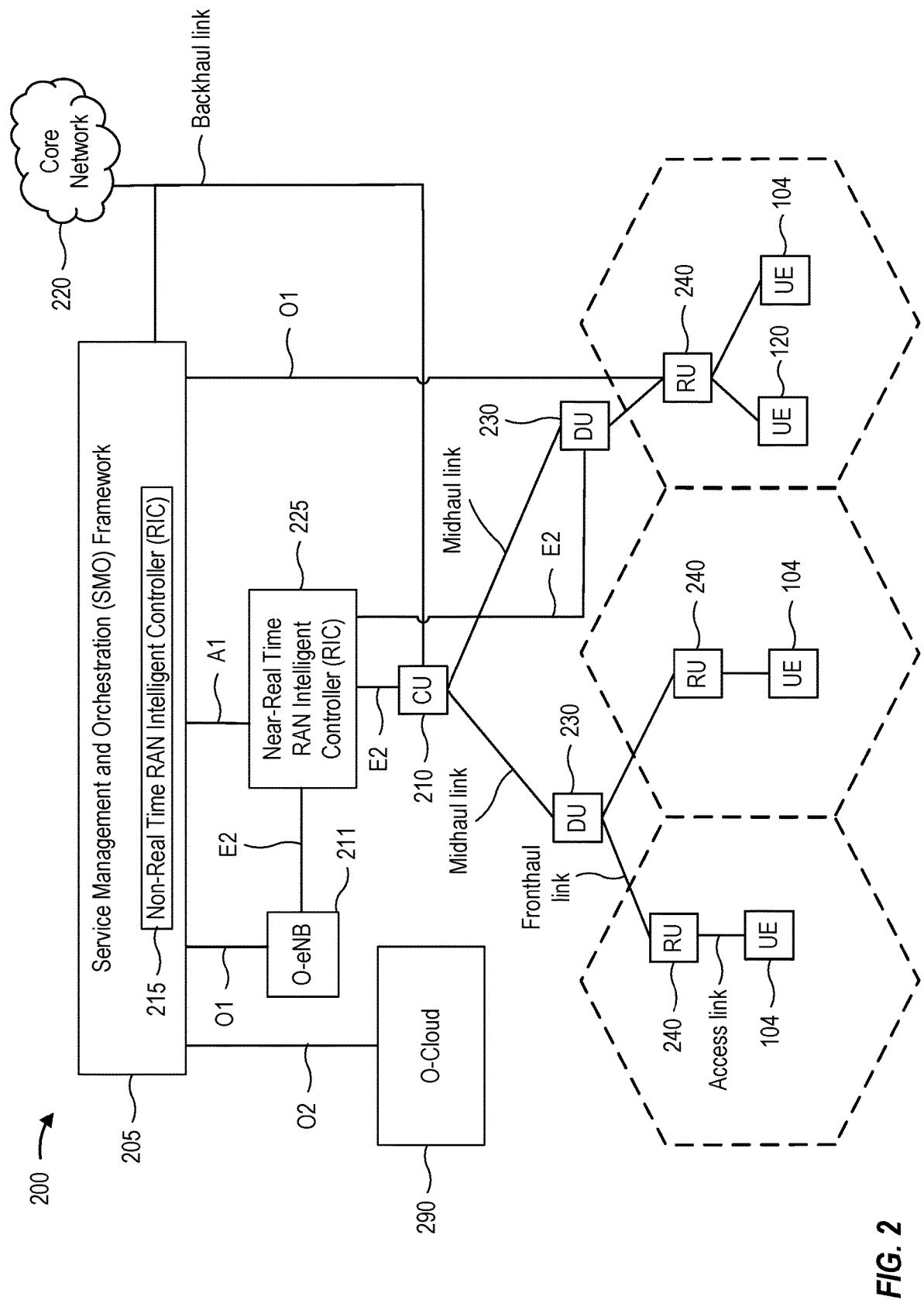
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-52,600 MHz, which is sometimes referred to (interchangeably) as a "millimeter wave" ("mmW" or "mmWave"). A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (MC) 225 via an E2 link, or a Non-Real Time (Non-RT) MC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
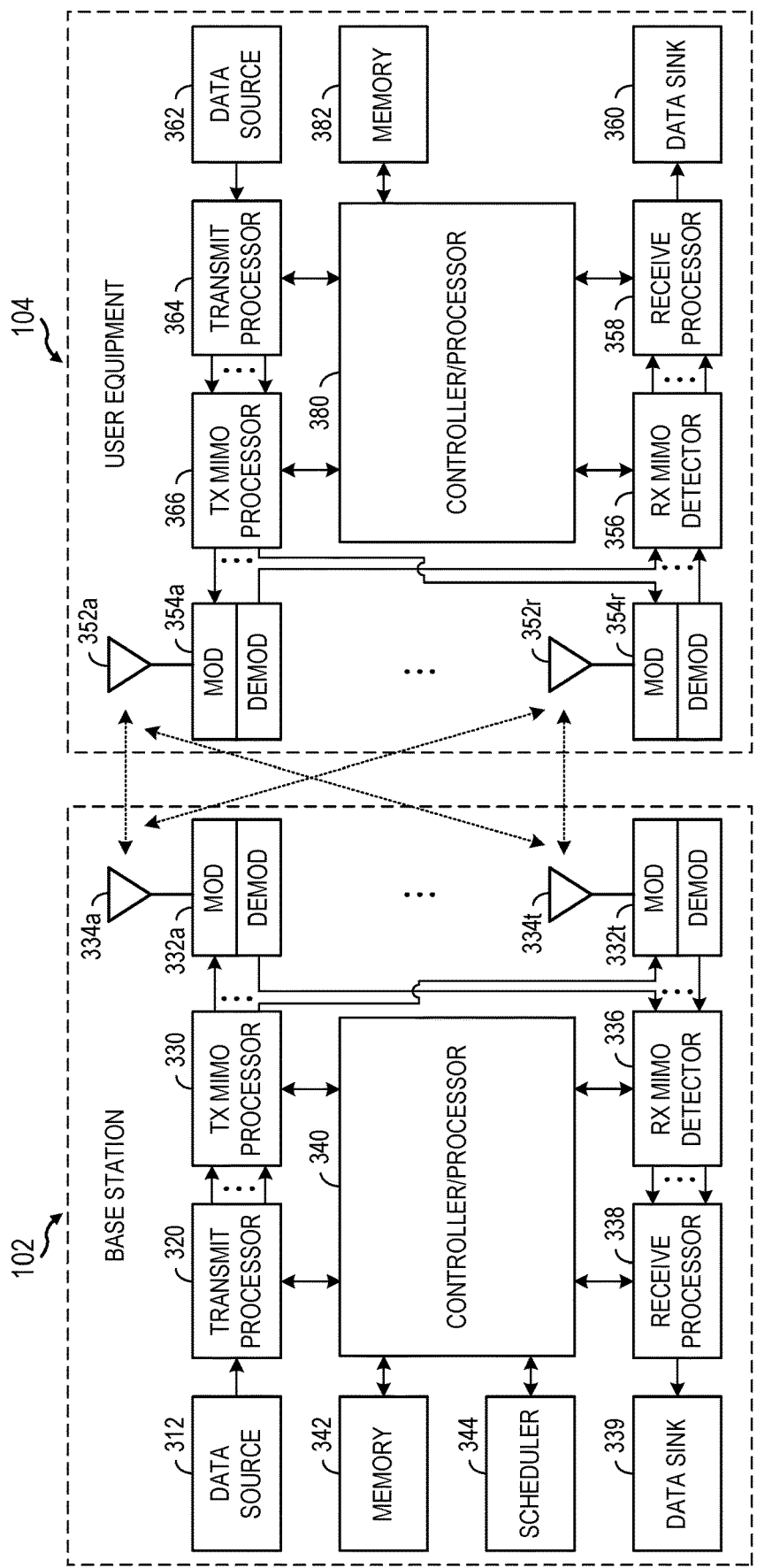
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334a-t (collectively 334), transceivers 332a-t (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352a-r (collectively 352), transceivers 354a-r (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332a-332t. Each modulator in transceivers 332a-332t may process a respective output symbol stream to obtain an output sample stream. Each modulator may further process (e.g., convert to analog, amplify, filter, and upconvert) the output sample stream to obtain a downlink signal. Downlink signals from the modulators in transceivers 332a-332t may be transmitted via the antennas 334a-334t, respectively.

In order to receive the downlink transmission, UE 104 includes antennas 352a-352r that may receive the downlink signals from the BS 102 and may provide received signals to the demodulators (DEMODs) in transceivers 354a-354r, respectively. Each demodulator in transceivers 354a-354r may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354a-354r, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354a-354r (e.g., for SC-FDM), and transmitted to BS 102.

At BS 102, the uplink signals from UE 104 may be received by antennas 334a-t, processed by the demodulators in transceivers 332a-332t, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332a-t, antenna 334a-t, and/or other aspects described herein. Similarly, "receiving" may refer to various mechanisms of obtaining data, such as obtaining data from antennas 334a-t, transceivers 332a-t, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354a-t, antenna 352a-t, and/or other aspects described herein. Similarly, "receiving" may refer to various mechanisms of obtaining data, such as obtaining data from antennas 352a-t, transceivers 354a-t, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

Figure 4:
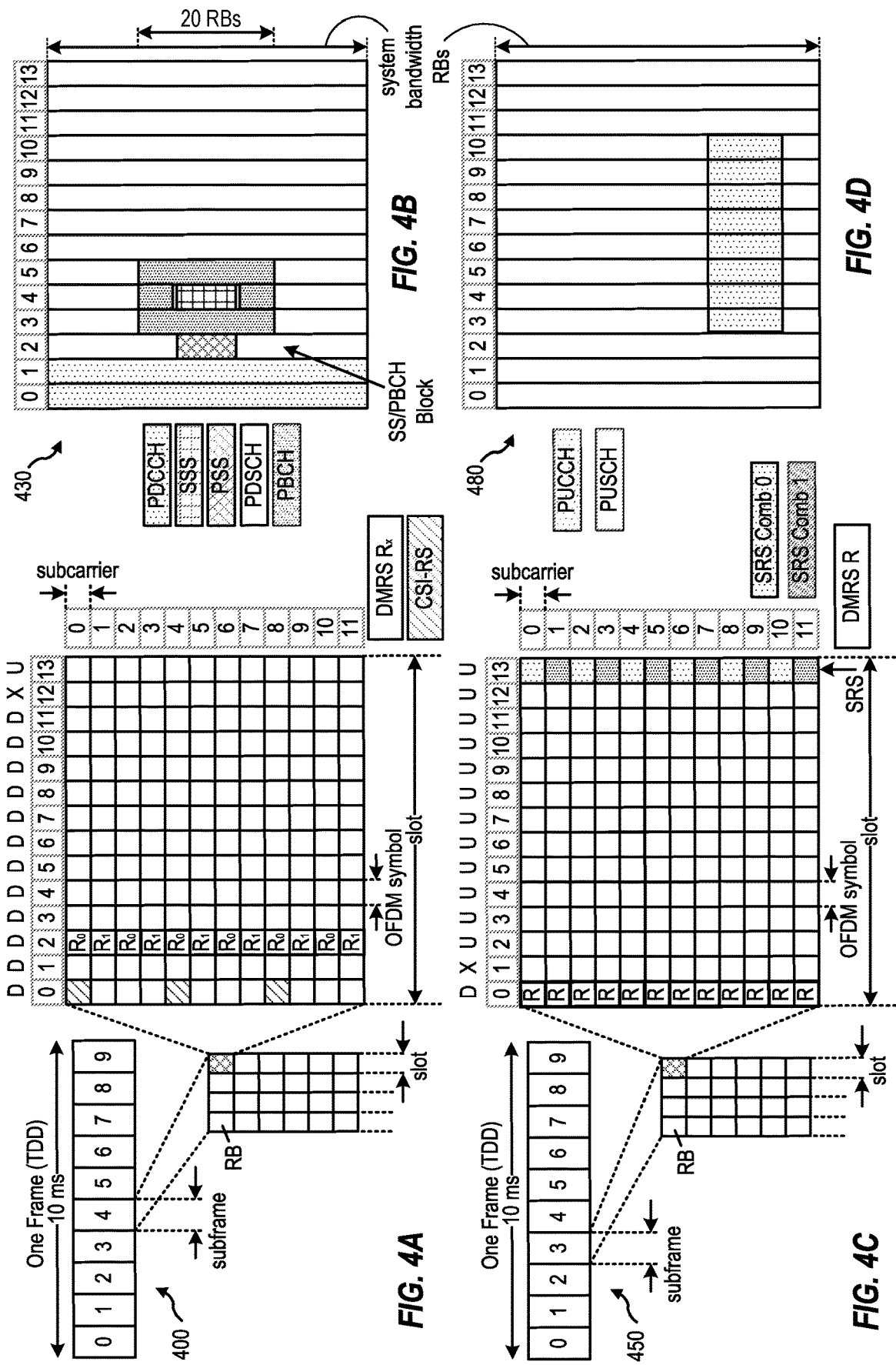
FIGS. 4A, 4B, 4C, and 4D depict various example aspects of data structures for a wireless communications network.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to $2^{\mu} \times 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Aspects Related to A-SRS Triggering

A UE (e.g., a UE 104) may be configured with one or more SRS resource set configurations. An SRS resource set includes one or more SRS resource. The SRS resource specifies the time and frequency domain location of an SRS transmission. For example, a UE may be configured semi-static via one or more RRC parameters. An RRCE parameter SRS-Config may include an SRS-ResourceSet parameter that configures an aperiodicSRS-ResourceTrigger and optional slotOffset parameter. The RRC parameter SRS-Resource configures the SRS resources. The SRS configuration may be carries in a system information block (e.g., SIB2), an RRC connection set up message, and/or an RRC connection reconfiguration message.

Figure 5:
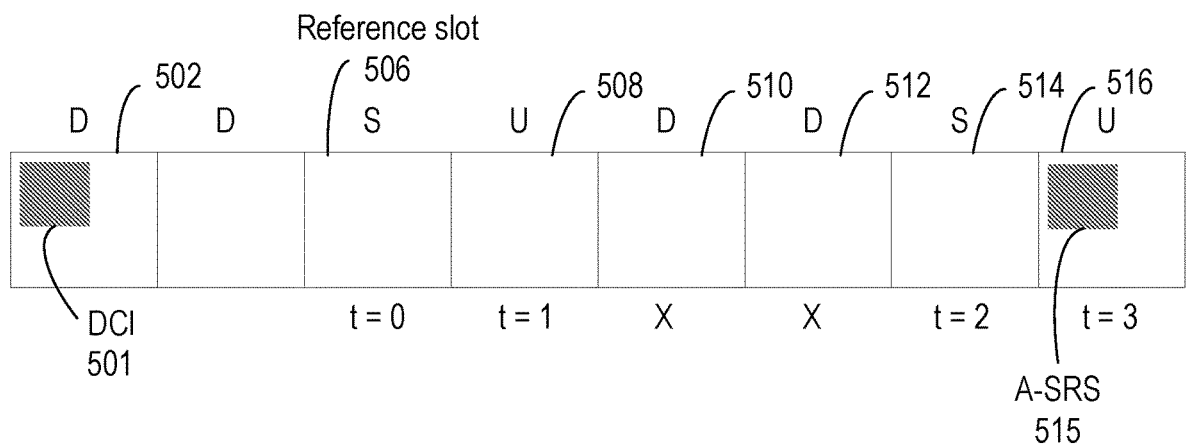
FIG. 5 depicts example A-SRS triggering.

FIG. 5 depicts example A-SRS triggering. In some systems (e.g., 3GPP Release-17 systems), when an A-SRS triggering DCI 501 is received in a first slot 502 (e.g., slot n), the UE transmits the A-SRS after an offset number of available slots, t, from a reference slot (e.g., in the t+1th slot).

In some examples, the reference slot is the slot, n, in which the triggering DCI is received. In some examples, the reference slot is a slot (e.g., slot n+k) that is a first offset number of slots, k, from the first slot 502 (e.g., slot n) in which the A-SRS triggering DCI 501 is received. The first offset number of slots (k) may be configured by the RRC signaling with the SRS resource set configuration, such as by the slotOffset parameter. The first offset may be zero, such as when the optional slotOffset parameter is not included. In the illustrated example, k=2. In this example, the reference slot is the slot 506 two slots following the first slot 502 in which the A-SRS triggering DCI is received, as shown in FIG. 5.

The second offset number of available slot, t, from the reference slot may be indicated by the A-SRS triggering DCI. Each SRS resource may be configured with a set of offset (t) values. In some aspects, each SRS resource is configured with up to four offset (t) values. A reconfigurable bit field in the A-SRS triggering DCI (e.g., up to two bits) indicates one of the offset (t) values. FIG. 6 is a table 600 depicting example downlink control information DCI codepoints mapped to A-SRS slot offsets. The A-SRS triggering DCI may be any of a DCI that schedules PDSCH, a DCI that schedules PUSCH, a DCI format 0_1, a DCI format 0_2, a DCI without data, or a DCI without a channel state information (CSI) request. In some examples, the offset (t) value is configured by RRC signaling. In this case, only a single offset (t) value may be configured for the SRS resources.

The available slots includes uplink and flexible slots, whereas downlink slots are not counted towards the offset number of available slots. In some examples, an available slot is a slot that satisfies: there are UL or flexible symbol(s) for the time-domain location(s) for all the SRS resources in the resource set and it satisfies the minimum timing requirement between triggering PDCCH and all the SRS resources in the resource set. In some examples, an available slot is a slot that satisfies: there are UL or flexible symbol(s) for the time-domain location(s) for all the SRS resources in the resource set and it satisfies UE capability on the minimum timing requirement between triggering PDCCH and all the SRS resources in the resource set; and from the first symbol carrying the SRS request DCI and to the last symbol of the triggered SRS resource set, UE does not expect to receive slot format indicator (SFI) indication, UL cancellation indication or dynamic scheduling of DL channel/signal(s) on flexible symbol(s) that may change the determination of available slot.

In the illustrated example, the A-SRS triggering DCI indicates t=2 (e.g., DCI codepoint 10). Accordingly, the UE counts, starting from reference slot 506, uplink slot 508 as a first available slot, downlink slots 510 and 512 as unavailable, flexible slot 514 as a second available slot, and uplink slot 516 as the third available slot (e.g., the t+1th available slot) and transmits A-SRS 515 in slot 516.

Certain systems, however, support FD operation. As compared to older communication standards, the spectrum options for 5G NR are considerably expanded. For example, the frequency range 2 (FR2) band extends from approximately 24 GHz to GHz. Since the wavelength decreases as the frequency increases, the FR2 band is denoted as a mmWave band due to its relatively-small wavelengths. In light of this relatively short wavelength, the transmitted radio frequency (RF) signals in the FR2 band behave somewhat like visible light. Thus, just like light, mmWave signals are readily shadowed by buildings and other obstacles. In addition, the received power per unit area of antenna element goes down as the frequency goes up. For example, a patch antenna element is typically a fraction of the operating wavelength (e.g., one-half of the wavelength) in width and length. As the wavelength goes down (and thus the size of the antenna element decreases), it may thus be seen that the signal energy received at the corresponding antenna element decreases. mmWave cellular networks may employ a relatively-large number of BSs due to the issues of shadowing and decreased received signal strength.

As compared to the challenges of FR2, the electromagnetic properties of radio wave propagation in the sub-6 GHz bands are more accommodating. For example, the 5G NR frequency range 1 (FR1) band extends from approximately 0.4 GHz to 7 GHz. At these lower frequencies, the transmitted RF signals tend to refract around obstacles such as buildings so that the issues of shadowing are reduced. In addition, the larger size for each antenna element means that a FR1 antenna element intercepts more signal energy as compared to an FR2 antenna element. Thus, a 5G NR cellular network operating in the FR1 band can employ a fewer amount of BSs.

One issue with operation in the sub-6 GHz bands is that there is only so much bandwidth available. For this reason, the Federal Communications Commission regulates the airwaves and conducts auctions for the limited bandwidth in the FR1 band. Given this limited bandwidth, it is challenging for a cellular provider to enable the high data rates that would be more readily achieved in the FR2 band. To meet these challenges, a SBFD network architecture offers users the high data rates that would otherwise require usage of the FR2 band.

With SBFD, certain slots may be configured as downlink slots, certain slots may be configured as uplink slots, and certain slots may be configured as FD slots that support frequency duplexing for simultaneous uplink and downlink transmissions in the slot. During SBFD operation, one of the antenna arrays transmits while another antenna array is receiving. While aspects of the disclosure are discussed with respect to SBFD, it should be understood that the techniques apply to any type of FD system.

Figure 7:
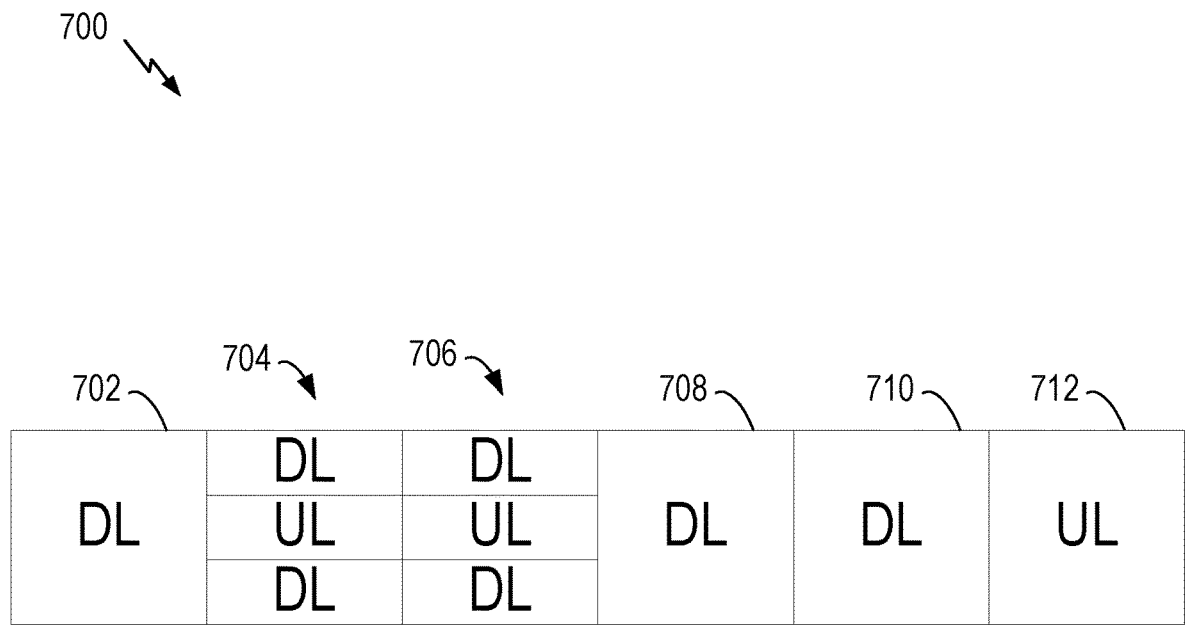
FIG. 7 depicts an example slot configuration with FD slots.

FIG. 7 depicts an example slot configuration 700 with FD slots. The slot 702, slot 708, and slot 710 are TDD slots that are dedicated to downlink (DL) transmissions and the slot 712 is a TDD slot that is dedicated to uplink (UL) transmissions. It will be appreciated that DL and UL transmissions may be divided into data and control transmissions channels as known in the 5G NR arts. In the DL slots 702, 708, and 710 and in the UL slot 712, the transmitted signal may occupy the entire (or some portion) of the slot frequency band. The slot 704 and the slot 706 are SBFD slots. In the SBFD slots 704 and 706, one antenna array may be dedicated to downlink and a second antenna array may be dedicated to uplink. In the SBFD slots 704 and 706, neither the UL nor the DL in the SBFD slots may occupy the entire frequency resource range (the frequency band) for these slots. Instead, as shown in FIG. 7, the UL may occupy a central sub-band in the frequency band for the SBFD slots 704 and 706 and the DL may occupy a lower subband that ranges from the lower frequency for the frequency band up to a lowest frequency for the UL central sub-band and an upper subband in the frequency band and extends from a greatest frequency for the UL central sub-band to a greatest frequency for the frequency band. It will be appreciated however, that the sub-bands may be separated by a guard band.

Aspects of the present disclosure provide techniques for determining a reference slot, an available slot, and a slot for A-SRS transmission in FD systems.

Example Operations of Entities in a Communications Network

Figure 8:
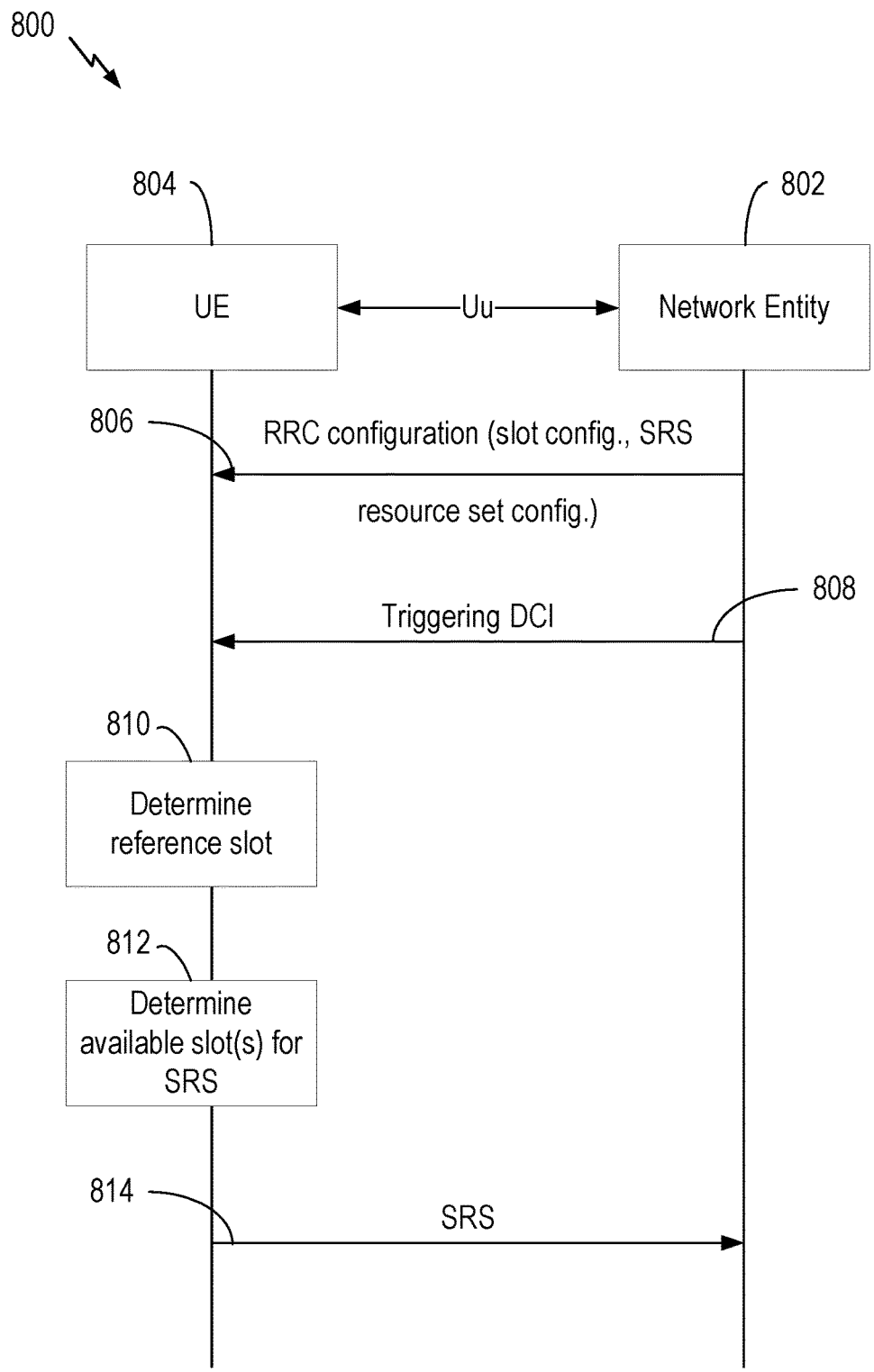
FIG. 8 depicts a process flow for communications in a network between a UE and a network entity.

FIG. 8 depicts a process flow 800 for communications in a network between a network entity 802 and a UE 804. In some aspects, the network entity 802 may be an example of the BS 102 depicted and described with respect to FIGS. 1 and 3 or a disaggregated BS depicted and described with respect to FIG. 2. Similarly, the UE 804 may be an example of UE 104 depicted and described with respect to FIGS. 1 and 3. However, in other aspects, UE 804 may be another type of wireless communications device and BS 802 may be another type of network entity or network node, such as those described herein.

As shown in FIG. 8, process flow 800 may begin, at 806, with UE 804 receiving an RRC configuration from network entity 802. In some examples, the RRC configuration at 806, configures a slot configuration. The slot configuration may configure one or more slots as uplink slots, one or more slots as downlink slots, and one or more slots as FD slots, such as the slot configuration 700 illustrated in FIG. 7. Additionally or alternatively, the RRC configuration at 806 may configure an SRS resource set configuration. Additionally or alternatively, the RRC configuration at 806 may configure a single offset (t) value. Additionally or alternatively, the RRC configuration at 806 may configure a set of offset (t) values for each SRS resource. Additionally or alternatively, the RRC configuration at 806 may configure one or more slot offsets (k). It should be understood that the RRC configuration at 806 may be separate signaling and may be multiple RRC configurations.

At 808, process flow 800 includes UE 804 receiving a triggering DCI from network entity 802. In some examples, the triggering DCI indicates a t offset value, such as via a DCI codepoint as shown in table 600 illustrated in FIG. 6.

At 810, process flow 800 includes UE 804 determining a reference slot.

According to certain aspects, an FD slot can be the reference slot.

Figure 9:
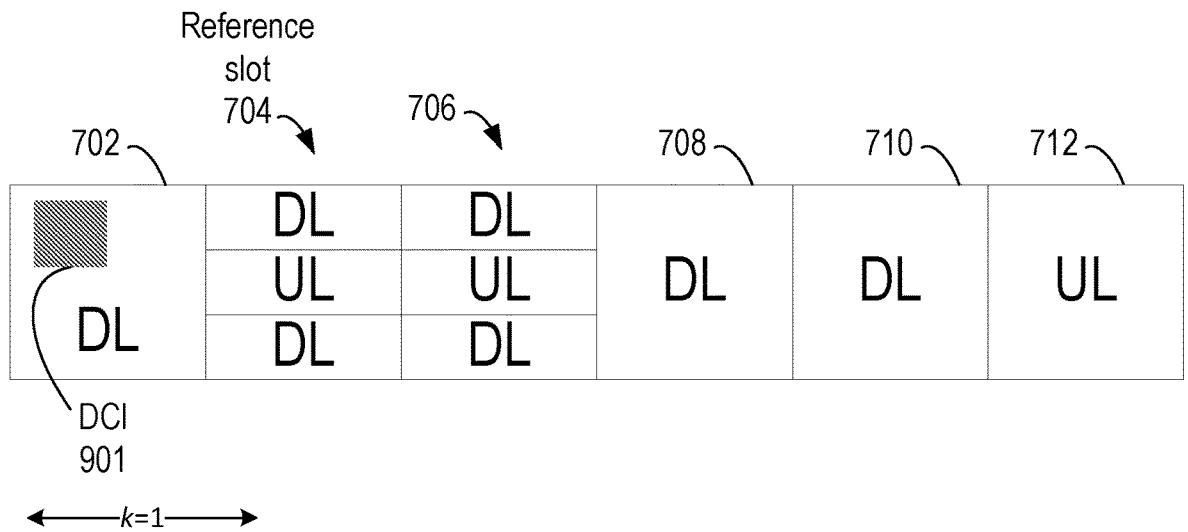
FIG. 9 depicts example A-SRS triggering with an FD reference slot after an offset from the A-SRS triggering DCI slot.

In some examples, the UE 804 determines, at 810, a slot, n+k, that is an offset, k, from the slot 702 in which the A-SRS triggering DCI 901 receives regardless whether the slot is an FD slot or a HD slot. For example, an A-SRS triggering DCI 901 may be received in a first slot 702 (slot n) of the slot configuration 700 as illustrated in FIG. 9. If k=1, UE 804 determines FD slot 704 as the reference slot as shown in FIG. 9, if k=2, UE 804 determines FD slot 706 as the reference slot, if k=3, UE 804 determines DL slot 708 as the reference slot, and so on.

Figure 10:
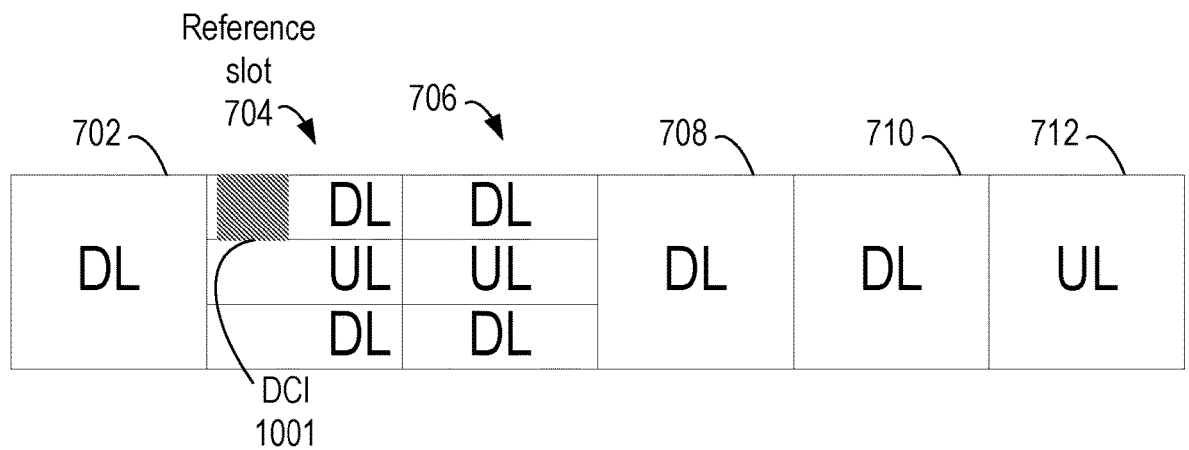
FIG. 10 depicts example A-SRS triggering with an FD reference slot as the A-SRS triggering DCI slot.

In some examples, the UE 804 determines, at 810, the slot in which the A-SRS triggering DCI is received as the reference slot regardless whether the slot is an FD slot or a HD slot. For example, an A-SRS triggering DCI 1001 may be received in a FD slot 704 (slot n) of the slot configuration 700 as illustrated in FIG. 10. UE 804 determines FD slot 704 as the reference slot.

According to certain aspects, an FD slot cannot be the reference slot.

Figure 11:
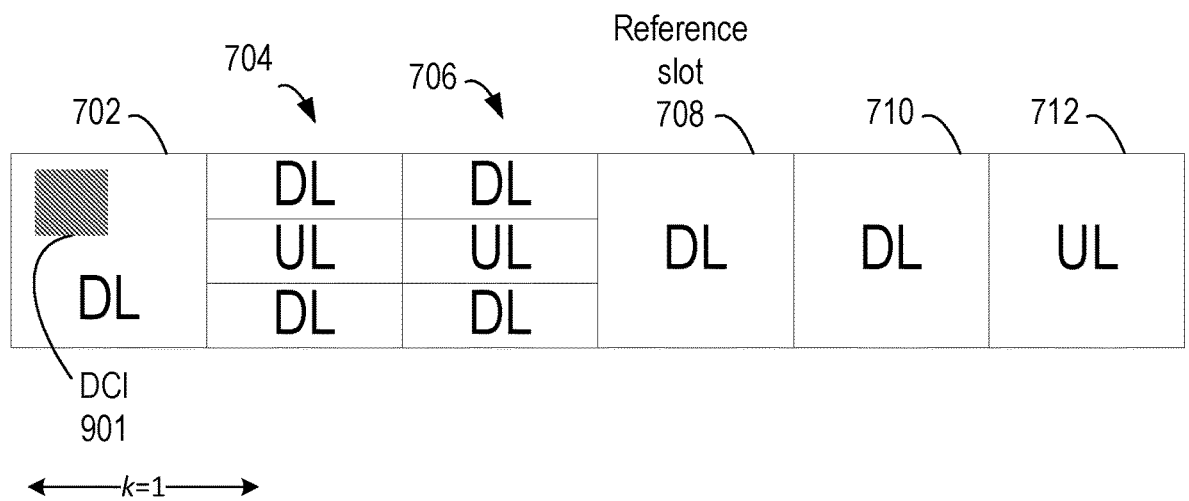
FIG. 11 depicts example A-SRS triggering with a first non-FD slot after an offset from the A-SRS triggering DCI slot as the reference slot.

In some examples, the UE 804 does not determine, at 810, the slot, n+k, as the reference slot when the slot is an FD slot. Instead, the UE 804 determines the first non-FD slot occurring after the slot, n+k, as the reference slot. For example, referring back to the example in FIG. 9, where the A-SRS triggering DCI 901 is received in slot 702, for k=1, the UE 804 does determine slot 704 as the reference slot. Instead, UE 804 determines downlink slot 708 as the reference slot as shown in FIG. 11. In this example, although not shown in FIG. 11, if k=2, UE 804 would not determine the FD slot 706 as the reference slot and instead, would determine downlink slot 708 as the reference slot; if k=3, UE 804 determines DL slot 708 as the reference slot, and so on.

In some examples, the UE 804 does not determine, at 810, the slot, n, in which the A-SRS triggering DCI is received as the reference slot when the slot is an FD slot. Instead, the UE 804 determines, at 810, the first non-FD slot occurring after the slot, n, may be determined as the reference slot.

Figure 12:
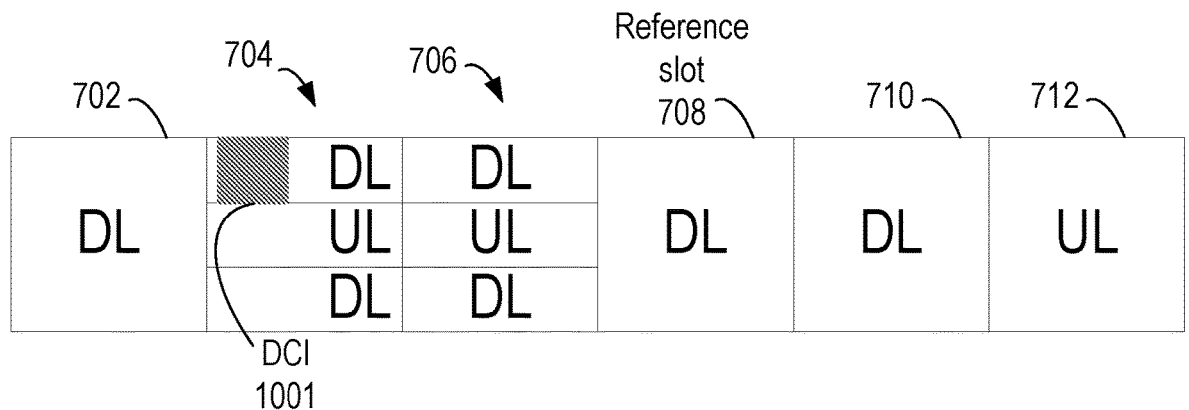
FIG. 12 depicts an example A-SRS triggering with an FD reference slot as the first non-FD slot after the A-SRS triggering DCI FD slot.

For example, referring back to the example in FIG. 10, where the A-SRS triggering DCI 1001 is received in FD slot 704, the UE 804 does determine slot 704 in which the A-SRS triggering DCI 1001 is received as the reference slot. Instead, UE 804 determines downlink slot 708 as the reference slot as shown in FIG. 12. In this example, although not shown in FIG. 12, if the A-SRS triggering DCI is received in FD slot 706, UE 804 would not determine the FD slot 706 in which the A-SRS triggering DCI 1001 is received as the reference slot and instead, would determine downlink slot 708 as the reference slot; if the A-SRS triggering DCI is received in DL slot 708, UE 804 determines DL slot 708 as the reference slot, and so on.

At 812, process flow 800 includes UE 804 determining available slot(s) for the A-SRS transmission. The UE 804 may determine DL slots as unavailable. The UE 804 may determine UL slots as available.

According to certain aspects, the availability of a given FD slot is based on the uplink bandwidth configured in the slot.

Figure 13:
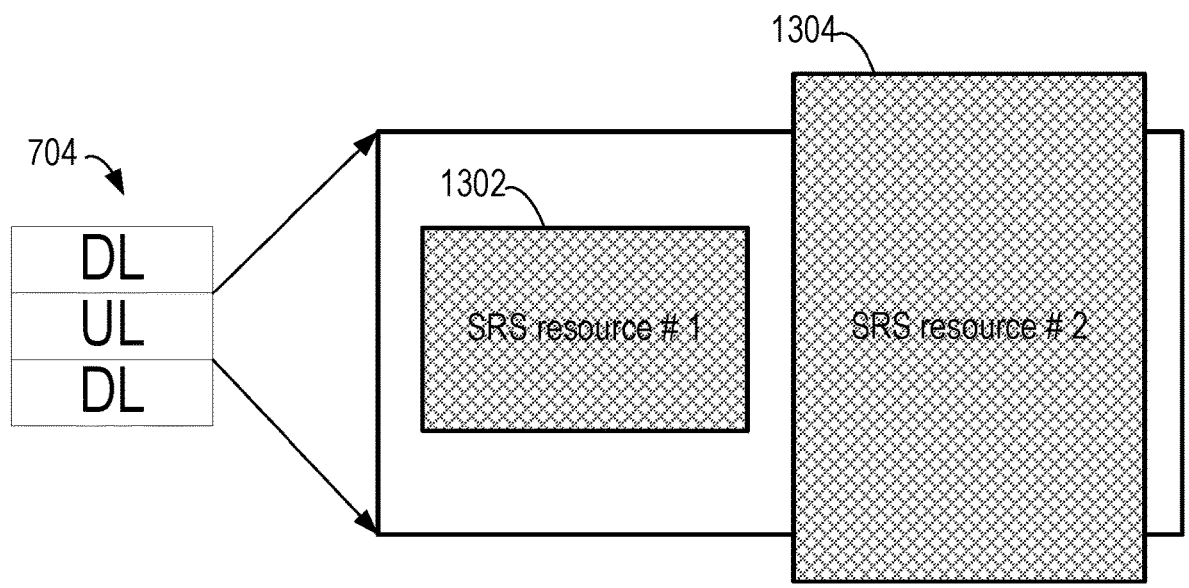
FIG. 13 depicts an example an SRS resource set partially fitting in an example FD slot.
Figure 14:
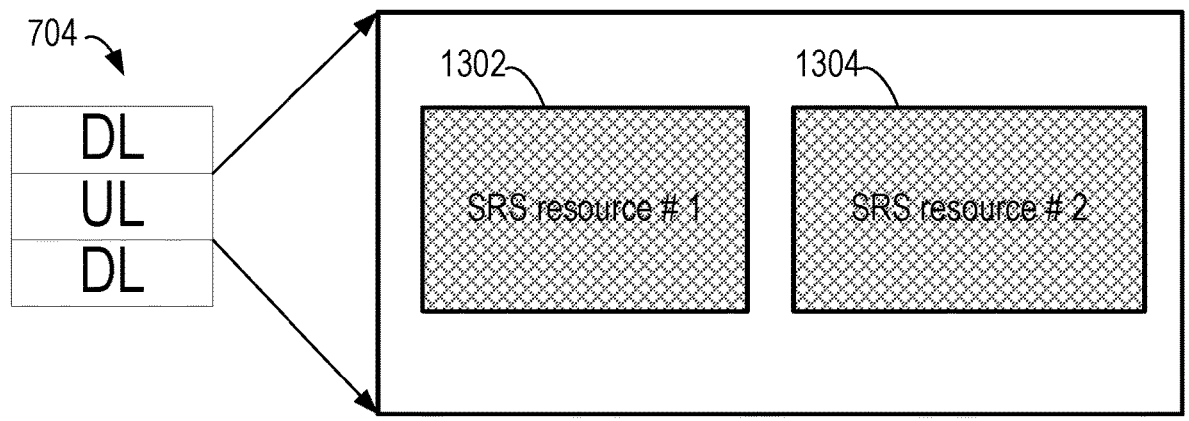
FIG. 14 depicts an example SRS resource set fitting an example FD slot.

In some examples, the UE 804 determines, at 812, a given slot to be available (e.g., counted towards the t available slots from the reference slot) only when all SRS resources of the triggered SRS resource set fit within the uplink bandwidth of the slot. Otherwise, the slot is determine to unavailable (e.g., not counted towards the t available slots from the reference slot). For example, as shown in FIG. 13, in the FD slot 704 an SRS resource 1302 may fit within the UL subband, but the SRS resource 1304 does not fit within the UL subband. In this case, UE 804 determines the FD slot 704 as unavailable. Alternatively, if both the SRS resource 1302 and the SRS resource 1304 fit within the UL subband as shown in FIG. 14, the UE 804 may determine the FD slot 704 as available.

In this example, an available slot may be a slot that satisfies: there are UL or flexible symbol(s) or full duplex slot for the time-domain location(s) and frequency domain resources for all the SRS resources in the resource set and it satisfies UE capability on the minimum timing requirement between triggering PDCCH and all the SRS resources in the resource set; and from the first symbol carrying the SRS request DCI and to the last symbol of the triggered SRS resource set, UE does not expect to receive SFI indication, UL cancellation indication or dynamic scheduling of DL channel/signal(s) on flexible symbol(s) that may change the determination of available slot.

Figure 15:
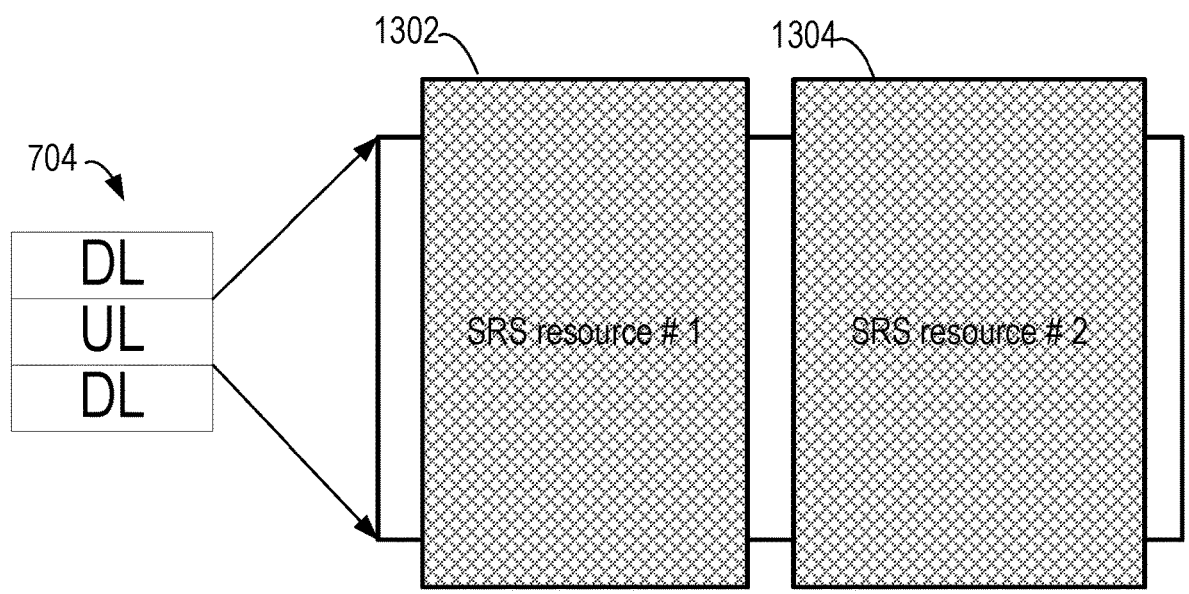
FIG. 15 depicts an example SRS resource set with no SRS resources fitting in an example FD slot.

In some examples, the UE 804 determines, at 812, a given slot to be available when at least one of the SRS resources of the triggered SRS resource set fit within the uplink bandwidth of the slot. Referring back to FIG. 13, the UE 804 determines the FD slot 704 as available because SRS resource 1302 fits within the UL subband. In some examples, the UE 804 drops the SRS resource 1304 that does not fit within the UL subband. Referring to FIG. 14, the UE 804 determines the FD slot 704 as available because both of the SRS resources 1302 and 1304 fit within the UL subband. Alternatively, where neither SRS resource 1302 nor SRS resource 1304 fits within the UL subband as shown in FIG. 15, the UE 804 determines the FD slot as unavailable.

In this example, an available slot may be a slot that satisfies: there are UL or flexible symbol(s) or full duplex slot for the time-domain location(s) and frequency domain resources for at least one of the SRS resources in the resource set and it satisfies UE capability on the minimum timing requirement between triggering PDCCH and all the SRS resources in the resource set; and from the first symbol carrying the SRS request DCI and to the last symbol of the triggered SRS resource set, UE does not expect to receive SFI indication, UL cancellation indication or dynamic scheduling of DL channel/signal(s) on flexible symbol(s) that may change the determination of available slot.

In some examples, the UE 804 determines, at 812, a given slot as available if a threshold amount of the triggered SRS resource set fits in the uplink bandwidth of the slot. For example, the UE 804 may determine, at 812, the given as available if there is a minimum configured uplink bandwidth in the slot in which the SRS resources overlap with the uplink bandwidth.

According to certain aspects, the UE 804 determines, at 812, a given FD slot as available regardless of the uplink bandwidth configured in the FD slot.

In some examples, when the UE 804 determines an FD slot as available and the FD slot does not fit all of the SRS resources of the triggered SRS resource set in the uplink bandwidth configured in the FD slot, the UE 804 generates a new SRS sequence. For example, the UE 804 may generate a different Zadoff-Chu sequence for the SRS resources. The new sequence may involve an available uplink resource elements (REs) in the FD slot, such that with the new sequence the SRS resource now fits within the UL subband of the FD slot. For example, the UE 804 may generate the sequence:

$$M_{SRS}^{SC}(\text{length of ZC sequence}) = \frac{12 \times m_{SRS,b}}{K_{TC}P_F},$$

where $M_{SRS}^{SC}$ is the length of the ZC sequence in subcarriers, $M_{SRS,b}$ is selected from a table, $K_{TC}$ is a transmission comb number determined by higher layers (e.g., in a transmissionComb parameter), and $P_F$ is a value signed by higher layers (e.g., in a FreqScalingFactor parameter), otherwise $P_F=1$.

Figure 16:
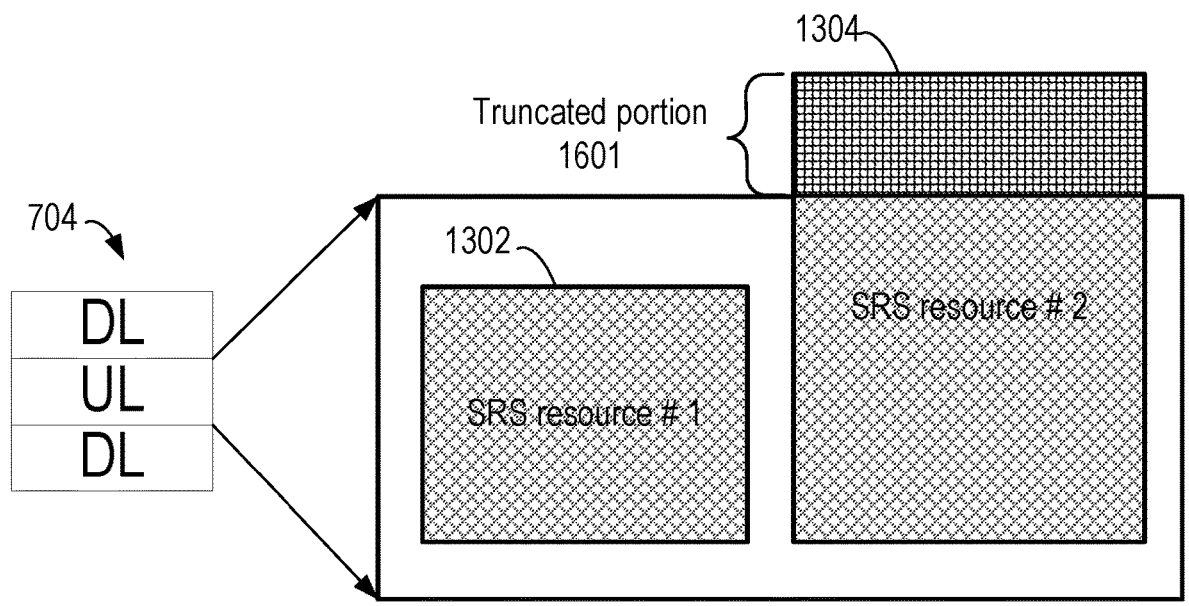
FIG. 16 depicts an example truncated SRS resource to fit an example FD slot.

In some examples, when the UE 804 determines an FD slot as available and the FD slot does not fit all of the SRS resources of the triggered SRS resource set in the uplink bandwidth configured in the FD slot, the UE 804 truncates the SRS sequence such that the SRS resource now fits within the UL subband. For example, the UE 804 truncates ZC samples mapped to REs outside of the UL subband of the FD slot. As shown in FIG. 16, the UE 804 may truncate a portion 1601 of the SRS resource 1304 such that the remaining SRS resource 1304 fits within the UL subband of the FD slot 704.

Figure 17A:
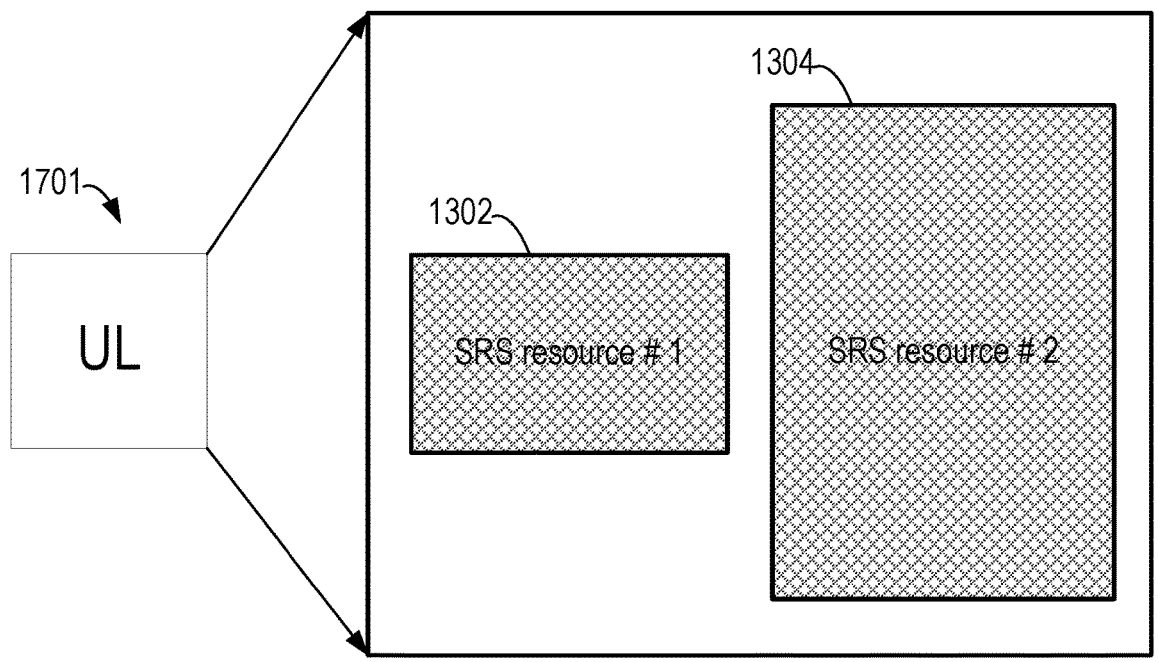
FIGS. 17A-17B depict different SRS resource frequency configurations for an example HD and FD slot, respectively.
Figure 17B:
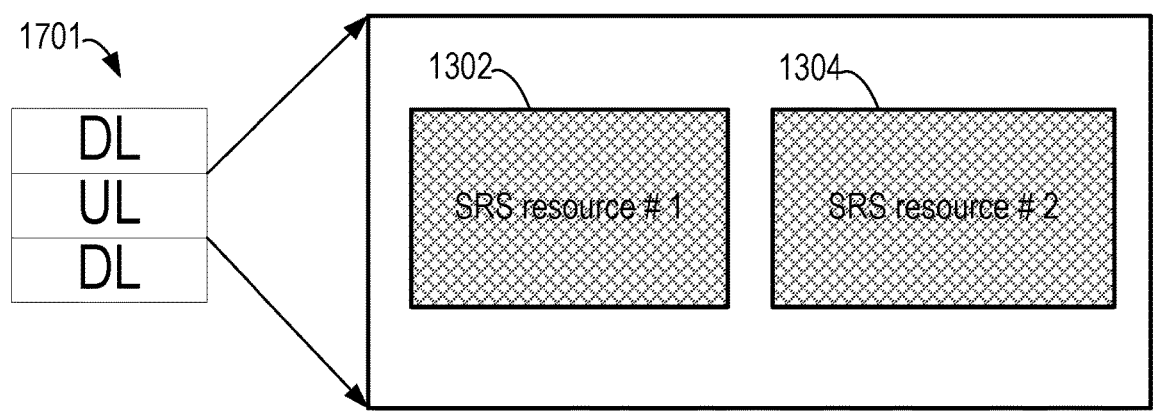
Figure 18:
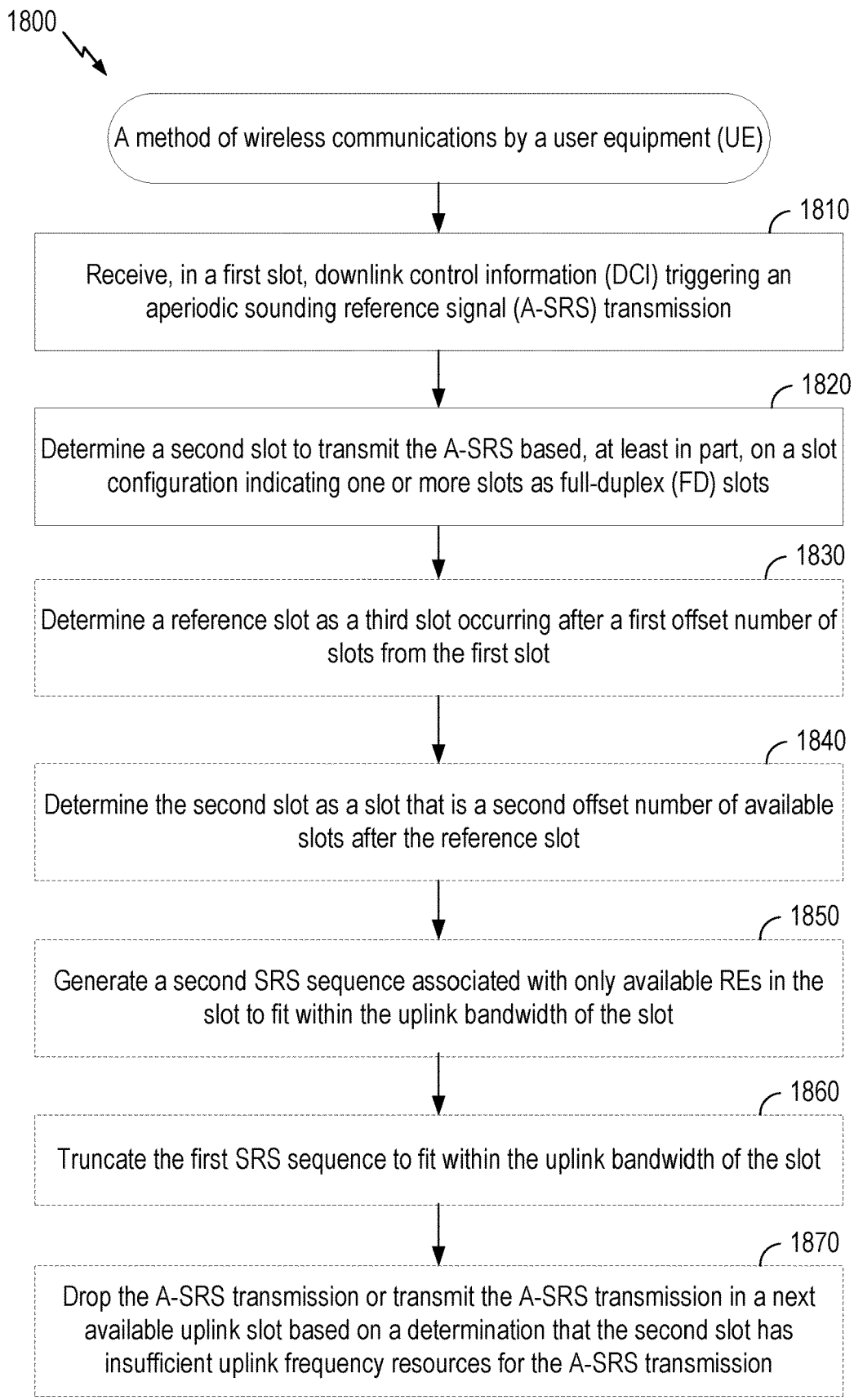
FIG. 18 depicts a method for wireless communications by a UE.
Figure 19:
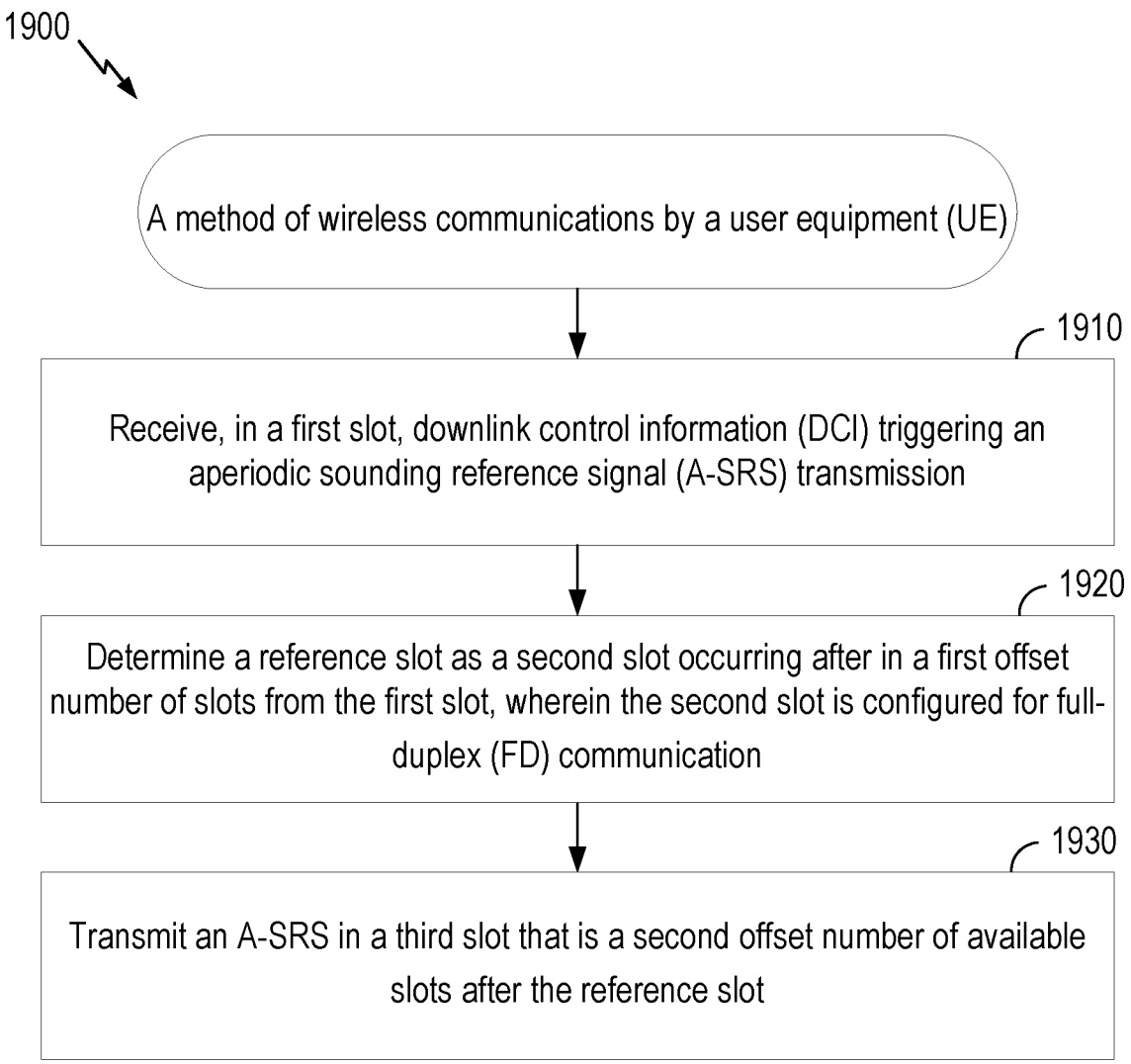
FIG. 19 depicts a method for wireless communications by a UE.
Figure 20:
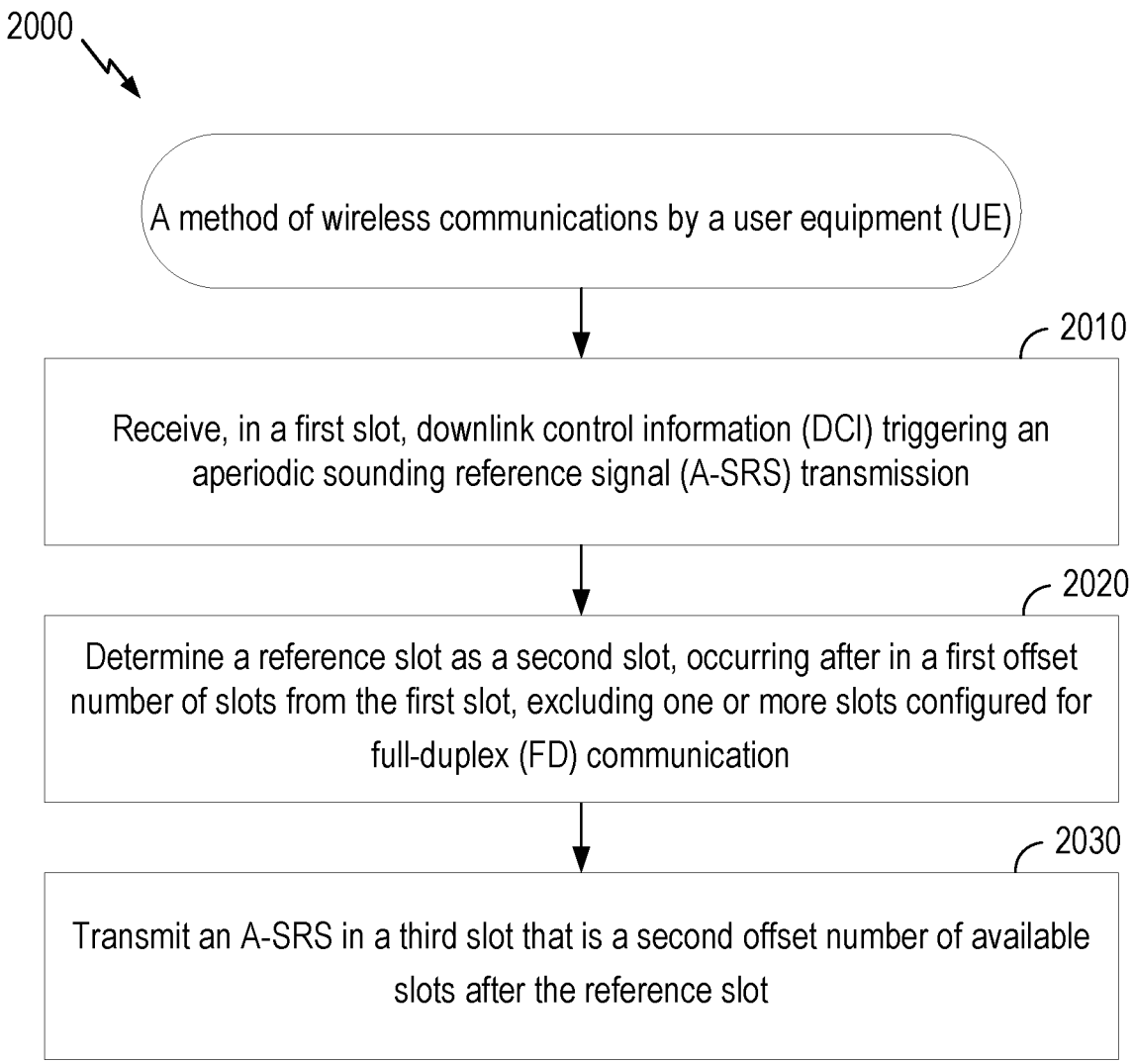
FIG. 20 depicts a method for wireless communications by a UE.
Figure 21:
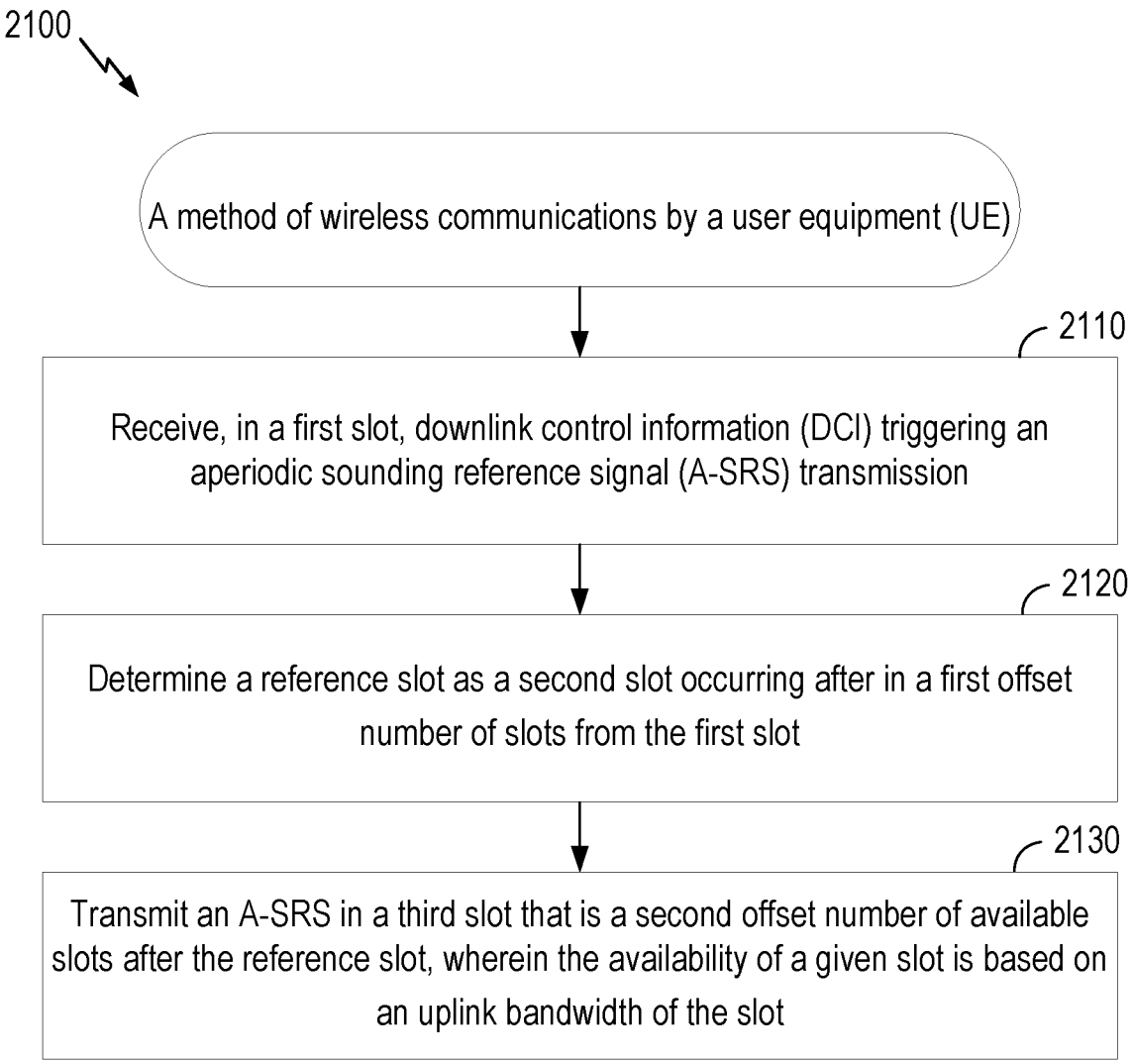
FIG. 21 depicts a method for wireless communications by a UE.
Figure 22:
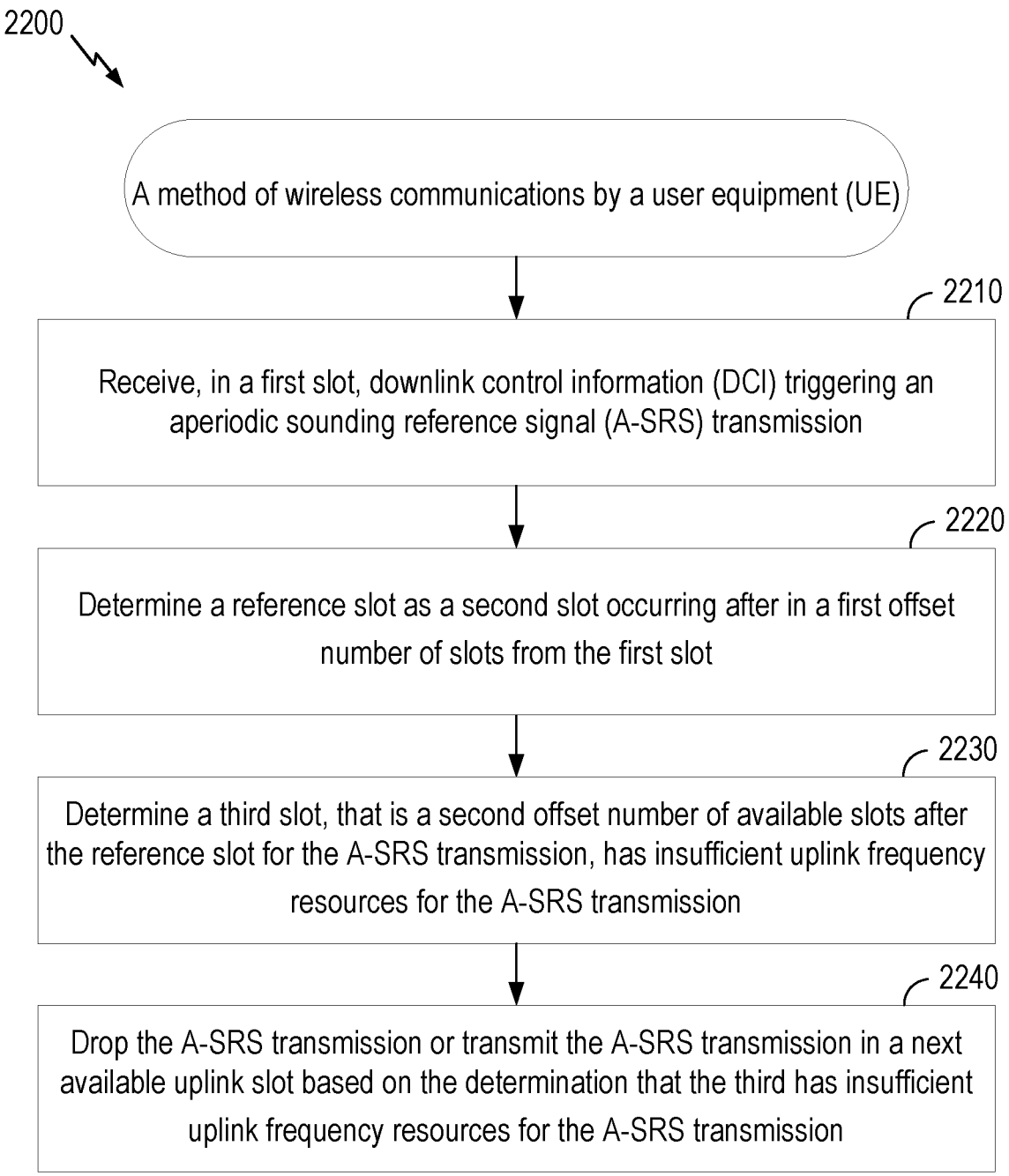
FIG. 22 depicts a method for wireless communications by a UE.

In some examples, the UE 804 is configured with a two frequency resource configurations for each SRS resource—one frequency resource configuration to be used for HD UL slots and one frequency resource configuration to be used for FD slots. As shown in FIGS. 17A-17B, the UE 804 may use a first frequency configuration for SRS resources 1302 and 1304 in the slot 1701 when the slot is a HD UL slot and a second frequency configuration for the SRS resources 1302 and 1304 in the slot 1701 when the slot is a FD slot. For example, as shown, the second frequency configuration for the SRS resource 1304 for the FD slot 1701 is smaller, such that the SRS resource 1304 fits within the UL subband in the FD slot 1701.

According to certain aspects, the A-SRS transmission is dropped if the slot pointed to by the t-value (e.g., the t+1th available slot) does not fit all of the SRS resources of the triggered SRS resource set in the uplink bandwidth of the slot. According to certain aspects, the A-SRS transmission is transmitted in a next available uplink slot if the slot pointed to by the t-value (e.g., the t+1th available slot) is a FD slot.

Example Operations of a User Equipment

FIGS. 18-22 show example methods 1800-2200, respectively, for wireless communications by a UE, such as UE 104 of FIGS. 1 and 3.

Method 1800 begins at 1810 with receiving, in a first slot, DCI triggering an A-SRS transmission.

Method 1800 then proceeds to step 1820 with determining a second slot to transmit the A-SRS based, at least in part, on a slot configuration indicating one or more slots as FD slots.

In one aspect, determining, at step 1820, the second slot to transmit the A-SRS includes determining, at 1830, a reference slot as a third slot occurring after a first offset number of slots from the first slot and determining, at 1840, the second slot as a slot that is a second offset number of available slots after the reference slot.

In one aspect, the first offset number of slots is zero or more slots.

In one aspect, the first offset number of slots is configured by RRC signaling, dynamic signaling, or is hardcoded at the UE.

In one aspect, determining the reference slot, at step 1830, as the third slot includes determining the third slot as the first slot in which the DCI triggering the A-SRS transmission is received.

In one aspect, determining the reference slot, at step 1830, as the third slot occurring the first offset number of slot from the first slot comprises excluding slots, from the first slot, configured as FD slots from the first offset number of slots.

In one aspect, determining the reference slot, at step 1830, as the third slot comprises determining a next slot after the first slot in which the DCI triggering the A-SRS transmission as the reference slot, excluding slots configured as FD slot.

In one aspect, determining the second slot as a slot that is a second number of available slots after the reference slot, at 1840, includes determining the availability of a given slot based on an uplink bandwidth of the slot.

In one aspect, the second offset number of available slots comprises at least one of the one or more slots configured as FD slots.

In one aspect, method 1800 includes determining a given slot as unavailable when the slot is configured as a downlink slot.

In one aspect, the DCI triggers an SRS resource set for the A-SRS transmission and determining the availability of a given slot based on the uplink bandwidth of the slot includes determining a given slot as available when all SRS resources of the SRS resource set fit within the uplink bandwidth of the slot; or determining the given slot as unavailable when all SRS resources of the SRS resource set do not fit within the uplink bandwidth of the slot.

In one aspect, the DCI triggers an SRS resource set for the A-SRS transmission and determining the availability of a given slot based on the uplink bandwidth of the slot includes determining a given slot as available when at least one SRS resource of the SRS resource set fits within the uplink bandwidth of the slot; or determining the given slot as unavailable when none of the SRS resources of the SRS resource set fits within the uplink bandwidth of the slot.

In one aspect, the DCI triggers an SRS resource set for the A-SRS transmission and determining the availability of a given slot based on the uplink bandwidth of the slot includes determining that not all SRS resources of the SRS resource set fit within the uplink bandwidth of the slot. The SRS resource set is associated with a first SRS sequence. The method 1800 may include, at 1850, generating a second SRS sequence associated with only available REs in the slot; and determining the slot as available.

In one aspect, the DCI triggers an SRS resource set for the A-SRS transmission and determining the availability of a given slot based on the uplink bandwidth of the slot includes determining that not all SRS resources of the SRS resource set fit within the uplink bandwidth of the slot, wherein the SRS resource set is associated with a first SRS sequence. The method 1800 may include, at 1860, truncating the first SRS sequence to fit within the uplink bandwidth of the slot and determining the slot as available.

In one aspect, the UE is configured with a first frequency configuration to use for a SRS resource set for a half-duplex uplink slot and a second frequency configuration to use for the SRS resource set for a FD slot.

In one aspect, the DCI triggers an SRS resource set for the A-SRS transmission and determining the availability of a given slot based on the uplink bandwidth of the slot includes determining a given slot as available when an amount of frequency resources of the SRS resource set overlapping with the uplink bandwidth of the slot is equal to or more than a configured minimum threshold amount of bandwidth; or determining the given slot as unavailable when the amount of frequency resources of the SRS resource set overlapping with the uplink bandwidth of the slot is less than the configured minimum threshold amount of bandwidth.

In one aspect, method 1800 further includes determining the second slot has insufficient uplink frequency resources for the A-SRS transmission. The method 1800 may include, at 1870, dropping the A-SRS transmission or transmitting the A-SRS transmission in a next available uplink slot based on the determination.

In one aspect, method 1800 further includes RRC signaling configuring the first offset number of slots, the second offset number slots, and a SRS resource set configuration.

Method 1900 begins at 1910 with receiving, in a first slot, DCI triggering an A-SRS transmission.

Method 1900 then proceeds to step 1920 with determining a reference slot as a second slot occurring after a first offset number of slots from the first slot. The second slot is configured for FD communication.

Method 1900 then proceeds to step 1930 with transmitting an A-SRS in a third slot that is a second offset number of available slots after the reference slot.

In one aspect, the first offset number of slots comprises zero or more slots.

In one aspect, the first offset number of slots is configured by RRC signaling or is hardcoded at the UE.

In one aspect, the UE is configured to determine a slot in which the DCI triggering A-SRS transmission as the reference slot.

Method 2000 begins at 2010 with receiving, in a first slot, DCI triggering an A-SRS transmission.

Method 2000 then proceeds to step 1220 with determining a reference slot as a second slot, occurring after a first offset number of slots from the first slot, excluding one or more slots configured for FD communication.

Method 2000 then proceeds to step 2030 with transmitting an A-SRS in a third slot that is a second offset number of available slots after the reference slot.

In one aspect, the first offset number of slots comprises zero or more slots.

In one aspect, the first offset number of slots is configured by RRC signaling.

In one aspect, the UE is configured to determine a next slot after a in which the DCI triggering A-SRS transmission as the reference slot, excluding the one or more slots configured for FD.

Method 2100 begins at 2110 with receiving, in a first slot, DCI) triggering an A-SRS transmission.

Method 2100 then proceeds to step 2120 with determining a reference slot as a second slot occurring after a first offset number of slots from the first slot; and Method 2100 then proceeds to step 2130 with transmitting an A-SRS in a third slot that is a second offset number of available slots after the reference slot, wherein the availability of a given slot is based on an uplink bandwidth the slot.

In one aspect, the second offset number of available slots comprises at least one slot configured for FD communication.

In one aspect, the method 2100 further includes determining a given slot as unavailable when the slot is configured as a downlink slot.

In one aspect, the DCI triggers an SRS resource set for the A-SRS transmission. The method 2100 may further include determining a given slot as available when all SRS resources of the SRS resource set fit within the uplink bandwidth of the slot; or determining the given slot as unavailable when all SRS resources of the SRS resource set do not fit within the uplink bandwidth of the slot.

In one aspect, the DCI triggers an SRS resource set for the A-SRS transmission. The method 2100 may further include determining a given slot as available when at least one SRS resource of the SRS resource fits within the uplink bandwidth of the slot; or determining the given slot as unavailable when none of the SRS resources of the SRS resource fits within the uplink bandwidth of the slot.

In one aspect, the DCI triggers an SRS resource set for the A-SRS transmission. The method 2100 may further include determining that not all SRS resources of the SRS resource set fit within the uplink bandwidth of the slot, wherein the SRS resource set is associated with a first SRS sequence; and generating a second SRS sequence associated with only available REs in the slot.

In one aspect, the DCI triggers an SRS resource set for the A-SRS transmission. The method 2100 may further include determining that not all SRS resources of the SRS resource set fit within the uplink bandwidth of the slot, wherein the SRS resource set is associated with a first SRS sequence; and truncating the first SRS sequence to fit within the uplink bandwidth of the slot.

In one aspect, the UE is configured with a first frequency configuration for a SRS resource set for a half-duplex uplink slot and a second frequency configuration for the SRS resource set for a FD slot.

In one aspect, the DCI triggers an SRS resource set for the A-SRS transmission. The method 2100 may further include determining a given slot as available when an amount of frequency resources of the SRS resource set overlapping with the uplink bandwidth of the slot is equal to or more than a configured minimum threshold amount of bandwidth; or determining the given slot as unavailable when the amount of frequency resources of the SRS resource set overlapping with the uplink bandwidth of the slot is less than the configured minimum threshold amount of bandwidth.

Method 2200 begins at 2210 with receiving, in a first slot, DCI triggering an A-SRS transmission.

Method 2200 then proceeds to step 2220 with determining a reference slot as a second slot occurring after a first offset number of slots from the first slot.

Method 2200 then proceeds to step 2230 with determining a third slot, that is a second offset number of available slots after the reference slot for the A-SRS transmission, has insufficient uplink frequency resources for the A-SRS transmission; and Method 2200 then proceeds to step 2240 with dropping the A-SRS transmission or transmitting the A-SRS transmission in a next available uplink slot based on the determination that the third slot has insufficient uplink frequency resources for the A-SRS transmission.

In one aspect, the third slot is a FD slot.

Figure 24:
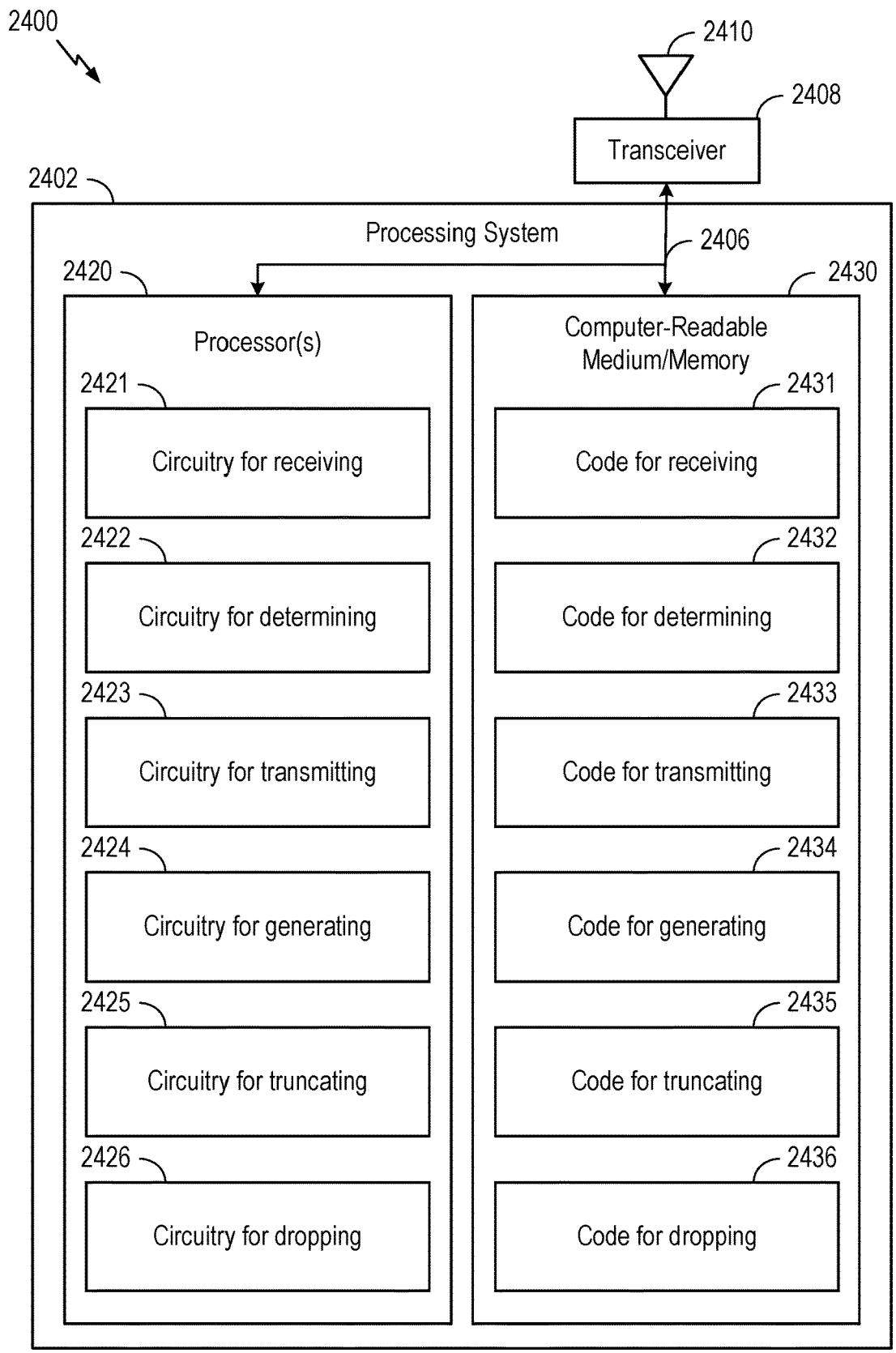
FIG. 24 depicts aspects of an example communications device.

In one aspect, methods 1800-2200, or any aspect related to the methods 1800-2200, may be performed by an apparatus, such as communications device 2400 of FIG. 24, which includes various components operable, configured, or adapted to perform the any one or more of the methods 1800-2200. Communications device 2400 is described below in further detail.

Note that FIGS. 18-22 are just some examples of methods, and other methods including fewer, additional, or alternative steps are possible consistent with this disclosure.

Example Operations of a Network Entity

Figure 23:
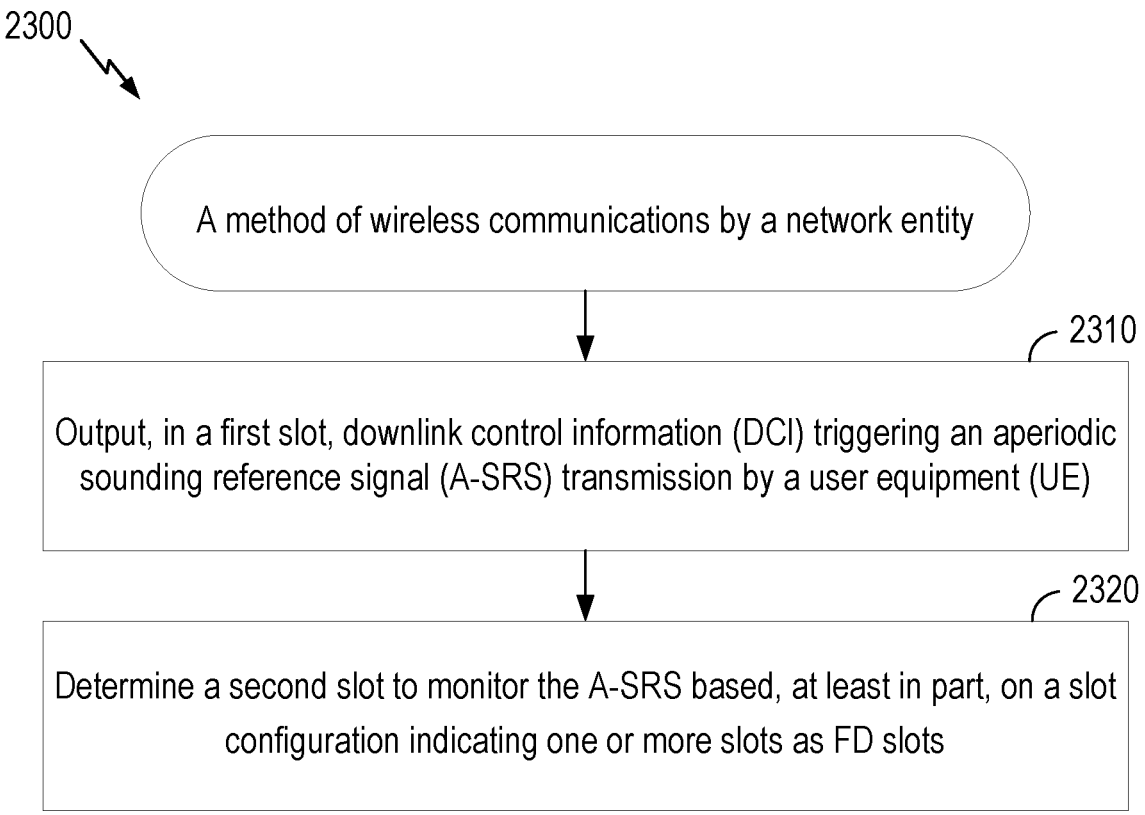
FIG. 23 depicts a method for wireless communications by a network entity.

FIG. 23 shows a method 2300 for wireless communications by a network entity, such as BS 102 of FIGS. 1 and 3, or a disaggregated base station as discussed with respect to FIG. 2.

Method 2300 begins at 2310 with outputting, in a first slot, DCI triggering an A-SRS transmission by a UE.

Method 2300 then proceeds to step 2320 with determining a second slot to monitor the A-SRS based, at least in part, on a slot configuration indicating one or more slots as FD slots.

Figure 25:
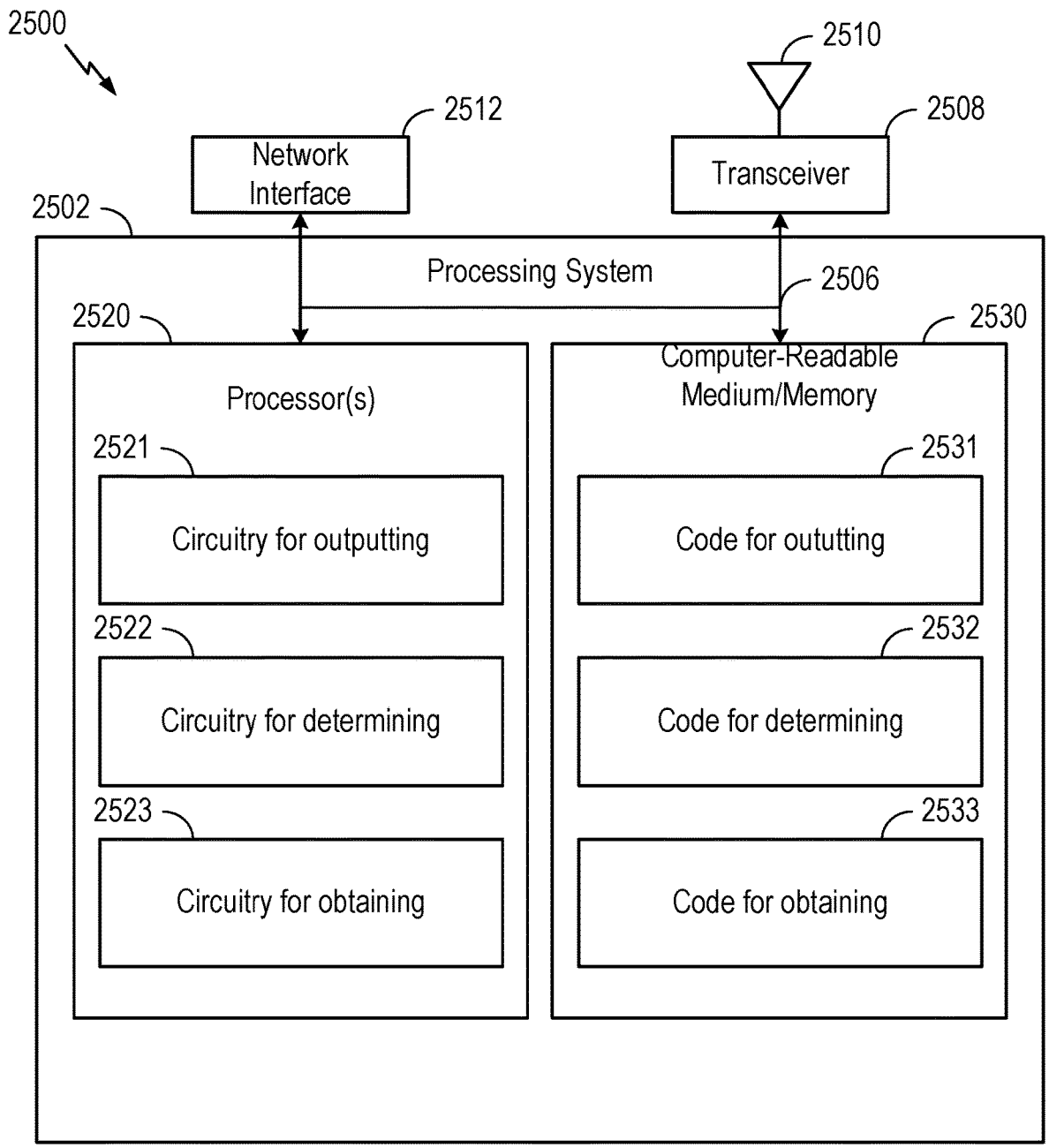
FIG. 25 depicts aspects of an example communications device.

In one aspect, method 2300, or any aspect related to it, may be performed by an apparatus, such as communications device 2500 of FIG. 25, which includes various components operable, configured, or adapted to perform the method 2300. Communications device 2500 is described below in further detail.

Note that FIG. 23 is just one example of a method, and other methods including fewer, additional, or alternative steps are possible consistent with this disclosure. For example, it should be understood that the network entity may perform corresponding steps to any of the steps performed by the UE illustrated in FIGS. 18-22.

Example Communications Devices

FIG. 24 depicts aspects of an example communications device 2400. In some aspects, communications device 2400 is a user equipment, such as UE 104 described above with respect to FIGS. 1 and 3.

The communications device 2400 includes a processing system 2402 coupled to a transceiver 2408 (e.g., a transmitter and/or a receiver). The transceiver 2408 is configured to transmit and receive signals for the communications device 2400 via an antenna 2410, such as the various signals as described herein. The processing system 2402 may be configured to perform processing functions for the communications device 2400, including processing signals received and/or to be transmitted by the communications device 2400.

The processing system 2402 includes one or more processors 2420. In various aspects, the one or more processors 2420 may be representative of one or more of receive processor 358, transmit processor 364, TX MIMO processor 366, and/or controller/processor 380, as described with respect to FIG. 3. The one or more processors 2420 are coupled to a computer-readable medium/memory 2430 via a bus 2406. In certain aspects, the computer-readable medium/memory 2430 is configured to store instructions (e.g., computer-executable code) that when executed by the one or more processors 2420, cause the one or more processors 2420 to perform the methods 1800-2200 described with respect to FIGS. 18-22, or any aspect related to it. Note that reference to a processor performing a function of communications device 2400 may include one or more processors performing that function of communications device 2400.

In the depicted example, computer-readable medium/memory 2430 stores code (e.g., executable instructions) for receiving 2431, code for determining 2432, code for transmitting 2433, code for generating 2434, code for truncating 2435, and code for dropping 2436. Processing of the code 2431-2436 may cause the communications device 2400 to perform the methods 1800-2200 described with respect to FIGS. 18-22, or any aspect related to them.

The one or more processors 2420 include circuitry configured to implement (e.g., execute) the code stored in the computer-readable medium/memory 2430, including circuitry for receiving 2421, circuitry for determining 2422, circuitry for transmitting 2423, circuitry for generating 2424, circuitry for truncating 2425, and circuitry for dropping 2426. Processing with circuitry 2421-2426 may cause the communications device 2400 to perform the methods 1800-2200 described with respect to FIGS. 18-22, or any aspect related to it.

Various components of the communications device 2400 may provide means for performing the methods 1800-2200 described with respect to FIGS. 18-22, or any aspect related to it. For example, means for transmitting, sending or outputting for transmission may include the transceivers 354 and/or antenna(s) 352 of the UE 104 illustrated in FIG. 3 and/or transceiver 2408 and antenna 2410 of the communications device 2400 in FIG. 24. Means for receiving or obtaining may include the transceivers 354 and/or antenna(s) 352 of the UE 104 illustrated in FIG. 3 and/or transceiver 2408 and antenna 2410 of the communications device 2400 in FIG. 24.

FIG. 25 depicts aspects of an example communications device. In some aspects, communications device 2500 is a network entity, such as BS 102 of FIGS. 1 and 3, or a disaggregated base station as discussed with respect to FIG. 2.

The communications device 2500 includes a processing system 2502 coupled to a transceiver 2508 (e.g., a transmitter and/or a receiver) and/or a network interface 2512. The transceiver 2508 is configured to transmit and receive signals for the communications device 2500 via an antenna 2510, such as the various signals as described herein. The network interface 2512 is configured to obtain and send signals for the communications device 2500 via communications link(s), such as a backhaul link, midhaul link, and/or fronthaul link as described herein, such as with respect to FIG. 2. The processing system 2502 may be configured to perform processing functions for the communications device 2500, including processing signals received and/or to be transmitted by the communications device 2500.

The processing system 2502 includes one or more processors 2520. In various aspects, one or more processors 2520 may be representative of one or more of receive processor 338, transmit processor 320, TX MIMO processor 330, and/or controller/processor 340, as described with respect to FIG. 3. The one or more processors 2520 are coupled to a computer-readable medium/memory 2530 via a bus 2506. In certain aspects, the computer-readable medium/memory 2530 is configured to store instructions (e.g., computer-executable code) that when executed by the one or more processors 2520, cause the one or more processors 2520 to perform the method [C]00 described with respect to FIG. 23, or any aspect related to it. Note that reference to a processor of communications device 2500 performing a function may include one or more processors of communications device 2500 performing that function.

In the depicted example, the computer-readable medium/memory 2530 stores code (e.g., executable instructions) for outputting 2531, code for XXX 2532, code for determining 2533, and code for obtaining 2534. Processing of the code 2531-2533 may cause the communications device 2500 to perform the method 2300 described with respect to FIG. 23, or any aspect related to it.

The one or more processors 2520 include circuitry configured to implement (e.g., execute) the code stored in the computer-readable medium/memory 2530, including circuitry for outputting 2521, circuitry for determining 2522, and circuitry for obtaining 2523. Processing with circuitry 2521-2523 may cause the communications device 2500 to perform the method 2300 as described with respect to FIG. 23, or any aspect related to it.

Various components of the communications device 2500 may provide means for performing the method 2300 as described with respect to FIG. 23, or any aspect related to it. Means for transmitting, sending or outputting for transmission may include the transceivers 332 and/or antenna(s) 334 of the BS 102 illustrated in FIG. 3 and/or transceiver 2508 and antenna 2510 of the communications device 2500 in FIG. 25. Means for receiving or obtaining may include the transceivers 332 and/or antenna(s) 334 of the BS 102 illustrated in FIG. 3 and/or transceiver 2508 and antenna 2510 of the communications device 2500 in FIG. 25.

Example Clauses

Implementation examples are described in the following numbered clauses:

Clause 1: A method of wireless communications by a user equipment (UE), comprising: receiving, in a first slot, downlink control information (DCI) triggering an aperiodic sounding reference signal (A-SRS) transmission; and determining a second slot to transmit the A-SRS based, at least in part, on a slot configuration indicating one or more slots as full-duplex (FD) slots.

Clause 2: The method of Clause 1, wherein determining the second slot to transmit the A-SRS comprises: determining a reference slot as a third slot occurring after a first offset number of slots from the first slot; and determining the second slot as a slot that is a second offset number of available slots after the reference slot.

Clause 3: The method of Clause 2, wherein the first offset number of slots comprises zero or more slots.

Clause 4: The method of any one or more of Clauses 2-3, wherein: the first offset number of slots is configured by radio resource control (RRC) signaling, dynamic signaling, or is hardcoded at the UE; and the second offset number of available slots is indicated in the DCI triggering the A-SRS transmission.

Clause 5: The method of any one or more of Clauses 2-4, wherein determining the reference slot as the third slot comprises determining the third slot as the first slot in which the DCI triggering the A-SRS transmission is received.

Clause 6: The method of any one or more of Clauses 2-5, wherein determining the reference slot as the third slot occurring after the first offset number of slot from the first slot comprises excluding slots, from the first slot, configured as FD slots from the first offset number of slots.

Clause 7: The method of any one or more of Clauses 2-6, wherein determining the reference slot as the third slot comprises determining a next slot after the first slot in which the DCI triggering the A-SRS transmission as the reference slot, excluding slots configured as FD slot.

Clause 8: The method of any one or more of Clauses 2-7, wherein the availability of a given slot is based on an uplink bandwidth of the slot.

Clause 9: The method of any one or more of Clause 8, wherein the second offset number of available slots comprises at least one of the one or more slots configured as FD slots.

Clause 10: The method of any one or more of Clauses 8-9, further comprising determining a given slot as unavailable when the slot is configured as a downlink slot.

Clause 11: The method of any one or more of Clauses 8-10, wherein: the DCI triggers an SRS resource set for the A-SRS transmission; and determining the availability of a given slot based on the uplink bandwidth of the slot comprises: determining a given slot as available when all SRS resources of the SRS resource set fit within the uplink bandwidth of the slot; or determining the given slot as unavailable when all SRS resources of the SRS resource set do not fit within the uplink bandwidth of the slot.

Clause 12: The method of any one or more of Clauses 8-11, wherein: the DCI triggers an SRS resource set for the A-SRS transmission; and determining the availability of a given slot based on the uplink bandwidth of the slot comprises: determining a given slot as available when at least one SRS resource of the SRS resource set fits within the uplink bandwidth of the slot; or determining the given slot as unavailable when none of the SRS resources of the SRS resource set fits within the uplink bandwidth of the slot.

Clause 13: The method of any one or more of Clauses 8-12, wherein: the DCI triggers an SRS resource set for the A-SRS transmission; and determining the availability of a given slot based on the uplink bandwidth of the slot comprises: determining that not all SRS resources of the SRS resource set fit within the uplink bandwidth of the slot, wherein the SRS resource set is associated with a first SRS sequence; generating a second SRS sequence associated with only available resource elements (REs) in the slot; and determining the slot as available.

Clause 14: The method of any one or more of Clauses 8-13, wherein: the DCI triggers an SRS resource set for the A-SRS transmission; and determining the availability of a given slot based on the uplink bandwidth of the slot comprises: determining that not all SRS resources of the SRS resource set fit within the uplink bandwidth of the slot, wherein the SRS resource set is associated with a first SRS sequence; truncating the first SRS sequence to fit within the uplink bandwidth of the slot; and determining the slot as available.

Clause 15: The method of any one or more of Clauses 8-14, wherein the UE is configured with a first frequency configuration to use for a sounding reference signal (SRS) resource set for a half-duplex uplink slot and a second frequency configuration to use for the SRS resource set for a FD slot.

Clause 16: The method of any one or more of Clauses 8-15, wherein the DCI triggers an SRS resource set for the A-SRS transmission; and determining the availability of a given slot based on the uplink bandwidth of the slot comprises: determining a given slot as available when an amount of frequency resources of the SRS resource set overlapping with the uplink bandwidth of the slot is equal to or more than a configured minimum threshold amount of bandwidth; or determining the given slot as unavailable when the amount of frequency resources of the SRS resource set overlapping with the uplink bandwidth of the slot is less than the configured minimum threshold amount of bandwidth.

Clause 17: The method of any one or more of Clauses 2-16, further comprising: determining the second slot has insufficient uplink frequency resources for the A-SRS transmission; and dropping the A-SRS transmission or sending the A-SRS transmission in a next available uplink slot based on the determination.

Clause 18: The method of any one or more of Clauses 2-17, further comprising receiving radio resource control (RRC) signaling configuring the first offset number of slots, the second offset number of available slots, and a sounding reference signal (SRS) resource set configuration.

Clause 19: A method for wireless communications by a user equipment (UE), comprising: receiving, in a first slot, downlink control information (DCI) triggering an aperiodic sounding reference signal (A-SRS) transmission; determining a reference slot as a second slot occurring after a first offset number of slots from the first slot, wherein the second slot is configured for full-duplex (FD) communication; and transmitting an A-SRS in a third slot that is a second offset number of available slots after the reference slot.

Clause 20: The method of Clause 19, wherein the first offset number of slots comprises zero or more slots.

Clause 21: The method of any one or more of Clauses 19-20, wherein the first offset number of slots is configured by radio resource control (RRC) signaling or is hardcoded at the UE.

Clause 22: The method of any one or more of Clauses 19-21, wherein the UE is configured to determine a slot in which the DCI triggering A-SRS transmission as the reference slot.

Clause 23: A method for wireless communications by a user equipment (UE), comprising: receiving, in a first slot, downlink control information (DCI) triggering an aperiodic sounding reference signal (A-SRS) transmission; determining a reference slot as a second slot, occurring after a first offset number of slots from the first slot, excluding one or more slots configured for full-duplex (FD) communication; and transmitting an A-SRS in a third slot that is a second offset number of available slots after the reference slot.

Clause 24: The method of Clause 23, wherein the first offset number of slots comprises zero or more slots.

Clause 25: The method of any one or more of Clauses 23-24, wherein the first offset number of slots is configured by radio resource control (RRC) signaling.

Clause 26: The method of any one or more of Clauses 23-25, wherein the UE is configured to determine a next slot after a in which the DCI triggering A-SRS transmission as the reference slot, excluding the one or more slots configured for FD.

Clause 27: A method for wireless communications by a user equipment (UE), comprising: receiving, in a first slot, downlink control information (DCI) triggering an aperiodic sounding reference signal (A-SRS) transmission; determining a reference slot as a second slot occurring after a first offset number of slots from the first slot; and transmitting an A-SRS in a third slot that is a second offset number of available slots after the reference slot, wherein the availability of a given slot is based on an uplink bandwidth the slot.

Clause 28: The method of Clause 27, wherein the second offset number of available slots comprises at least one slot configured for full-duplex (FD) communication.

Clause 29: The method of any one or more of Clauses 27-28, further comprising determining a given slot as unavailable when the slot is configured as a downlink slot.

Clause 30: The method of any one or more of Clauses 27-29, wherein the DCI triggers an SRS resource set for the A-SRS transmission, and further comprising: determining a given slot as available when all SRS resources of the SRS resource set fit within the uplink bandwidth of the slot; or determining the given slot as unavailable when all SRS resources of the SRS resource set do not fit within the uplink bandwidth of the slot.

Clause 31: The method of any one or more of Clauses 27-30, wherein the DCI triggers an SRS resource set for the A-SRS transmission, and further comprising: determining a given slot as available when at least one SRS resource of the SRS resource fits within the uplink bandwidth of the slot; or determining the given slot as unavailable when none of the SRS resources of the SRS resource fits within the uplink bandwidth of the slot.

Clause 32: The method of any one or more of Clauses 27-31, wherein the DCI triggers an SRS resource set for the A-SRS transmission, and further comprising: determining that not all SRS resources of the SRS resource set fit within the uplink bandwidth of the slot, wherein the SRS resource set is associated with a first SRS sequence; and generating a second SRS sequence associated with only available resource elements (REs) in the slot.

Clause 33: The method of any one or more of Clauses 27-32, wherein the DCI triggers an SRS resource set for the A-SRS transmission, and further comprising: determining that not all SRS resources of the SRS resource set fit within the uplink bandwidth of the slot, wherein the SRS resource set is associated with a first SRS sequence; and truncating the first SRS sequence to fit within the uplink bandwidth of the slot.

Clause 34: The method of any one or more of Clauses 27-33, wherein the UE is configured with a first frequency configuration for a sounding reference signal (SRS) resource set for a half-duplex uplink slot and a second frequency configuration for the SRS resource set for a full-duplex slot.

Clause 35: The method of any one or more of Clauses 27-34, wherein the DCI triggers an SRS resource set for the A-SRS transmission, and further comprising: determining a given slot as available when an amount of frequency resources of the SRS resource set overlapping with the uplink bandwidth of the slot is equal to or more than a configured minimum threshold amount of bandwidth; or determining the given slot as unavailable when the amount of frequency resources of the SRS resource set overlapping with the uplink bandwidth of the slot is less than the configured minimum threshold amount of bandwidth.

Clause 36: A method for wireless communications by a user equipment (UE), comprising: receiving, in a first slot, downlink control information (DCI) triggering an aperiodic sounding reference signal (A-SRS) transmission; determining a reference slot as a second slot occurring after a first offset number of slots from the first slot; and determining a third slot, that is a second offset number of available slots after the reference slot for the A-SRS transmission, has insufficient uplink frequency resources for A-SRS transmission; and dropping the A-SRS transmission or sending the A-SRS transmission in a next available uplink slot based on the determination.

Clause 37: The method of Clause 36, wherein the third slot is a full duplex (FD) slot.

Clause 38: A method of wireless communications by a network entity, comprising: outputting, in a first slot, downlink control information (DCI) triggering an aperiodic sounding reference signal (A-SRS) transmission by a user equipment (UE); and determining a second slot to monitor the A-SRS transmission based, at least in part, on a slot configuration indicating one or more slots as full-duplex (FD) slots.

Clause 39: The method of Clause 38, wherein determining the second slot to monitor the A-SRS comprises: determining a reference slot as a third slot occurring after a first offset number of slots from the first slot; and determining the second slot as a slot that is a second offset number of available slots after the reference slot.

Clause 40: The method of any one or more of Clauses 39, wherein the first offset number of slots comprises zero or more slots.

Clause 41: The method of any one or more of Clauses 38-40, further comprising: outputting an indication of the first offset number of slots for configuring the UE by radio resource control (RRC) signaling or dynamic signaling; and indicating the second offset number of available slots in the DCI triggering the A-SRS transmission.

Clause 41: The method of any one or more of Clauses 39-41, wherein determining the reference slot as the third slot comprises determining the third slot as the first slot in which the DCI triggering the A-SRS transmission is output.

Clause 42. The method of any one or more of Clauses 39-41, wherein determining the reference slot as the third slot occurring after the first offset number of slot from the first slot comprises excluding slots, from the first slot, configured as FD slots from the first offset number of slots.

Clause 43: The method of any one or more of Clauses 39-42, wherein determining the reference slot as the third slot comprises determining a next slot after the first slot in which the DCI triggering the A-SRS transmission as the reference slot, excluding slots configured as FD slot.

Clause 44: The method of any one or more of Clauses 39-43, wherein the availability of a given slot is based on an uplink bandwidth of the slot.

Clause 45: The method of Clause 44, wherein the second offset number of available slots comprises at least one of the one or more slots configured as FD slots.

Clause 46: The method of any one or more of Clauses 44-45, further comprising determining a given slot as unavailable when the slot is configured as a downlink slot.

Clause 47: The method of any one or more of Clauses 44-46, wherein: the DCI triggers an SRS resource set for the A-SRS transmission; and determining the availability of a given slot based on the uplink bandwidth of the slot comprises: determining a given slot as available when all SRS resources of the SRS resource set fit within the uplink bandwidth of the slot; or determining the given slot as unavailable when all SRS resources of the SRS resource set do not fit within the uplink bandwidth of the slot.

Clause 48: The method of any one or more of Clauses 44-47, wherein: the DCI triggers an SRS resource set for the A-SRS transmission; and determining the availability of a given slot based on the uplink bandwidth of the slot comprises: determining a given slot as available when at least one SRS resource of the SRS resource set fits within the uplink bandwidth of the slot; or determining the given slot as unavailable when none of the SRS resources of the SRS resource set fits within the uplink bandwidth of the slot.

Clause 49: The method of any one or more of Clauses 44-48, further comprising outputting a first frequency configuration for the UE to use for a sounding reference signal (SRS) resource set for a half-duplex uplink slot and a second frequency configuration for the UE to use for the SRS resource set for a FD slot.

Clause 50: The method of any one or more of Clauses 44-49, wherein the DCI triggers an SRS resource set for the A-SRS transmission; and determining the availability of a given slot based on the uplink bandwidth of the slot comprises: determining a given slot as available when an amount of frequency resources of the SRS resource set overlapping with the uplink bandwidth of the slot is equal to or more than a configured minimum threshold amount of bandwidth; or determining the given slot as unavailable when the amount of frequency resources of the SRS resource set overlapping with the uplink bandwidth of the slot is less than the configured minimum threshold amount of bandwidth.

Clause 51: The method of any one or more of Clauses 39-50, further comprising: determining the second slot has insufficient uplink frequency resources for the A-SRS transmission; and determining not to monitor the A-SRS transmission or to monitor the A-SRS transmission in a next available uplink slot based on the determination.

Clause 52: The method of any one or more of Clauses 39-51, further comprising outputting a configuration of first offset number of slots, the second offset number of available slots, and a sounding reference signal (SRS) resource set configuration for transmission to the UE via radio resource control (RRC) signaling.

Clause 53: An apparatus, comprising: a memory comprising executable instructions; and a processor configured to execute the executable instructions and cause the apparatus to perform a method in accordance with any one of Clauses 1-52.

Clause 54: An apparatus, comprising means for performing a method in accordance with any one of Clauses 1-52.

Clause 55: A non-transitory computer-readable medium comprising executable instructions that, when executed by a processor of an apparatus, cause the apparatus to perform a method in accordance with any one of Clauses 1-52.

Clause 56: A computer program product embodied on a computer-readable storage medium comprising code for performing a method in accordance with any one of Clauses 1-52.

ADDITIONAL CONSIDERATIONS

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus of wireless communications by a user equipment (UE), the apparatus comprising:
   memory comprising computer-executable instructions; and
   one or more processors configured to, individually or collectively, execute the computer-executable instructions and cause the apparatus to:
      receive, in a first slot, downlink control information (DCI) triggering a sounding reference signal (SRS) resource set for an aperiodic sounding reference signal (A-SRS) transmission;
      determine a reference slot as a third slot occurring after a first offset number of slots from the first slot; and
      determine a second slot to transmit the A-SRS as a slot that is a second offset number of available slots after the reference slot, wherein a slot is indicated in a slot configuration as a full-duplex (FD) slot is an available slot, of the number of available slots, when all SRS resources of the triggered SRS resource set fit within an uplink bandwidth of the FD slot, and wherein the FD slot is an unavailable slot when one or more of the SRS resources of the triggered SRS resource set do not fit within the uplink bandwidth of the FD slot.

2. The apparatus of claim 1, wherein the first offset number of slots comprises zero or more slots.

3. The apparatus of claim 1, wherein the one or more processors are configured to, individually or collectively, execute the computer-executable instruction to cause the apparatus to:

receive radio resource control (RRC) signaling or dynamic signaling configuring the first offset number of slots, or wherein the first offset number of slots is hardcoded at the UE; and receive an indication of the second offset number of available slots in the DCI triggering the SRS resource set for the A-SRS transmission.

4. The apparatus of claim 1, wherein the one or more processors being configured to, individually or collectively, execute the computer-executable instructions to cause the apparatus to determine the reference slot as the third slot to transmit the A-SRS comprises the one or more processors being configured to, individually or collectively, execute the computer-executable instructions to cause the apparatus to determine the third slot as the first slot in which the DCI triggering the SRS resource set for the A-SRS transmission is received.

5. The apparatus of claim 1, wherein the processor being configured to, individually or collectively, execute the computer-executable instructions to cause the one or more processors to determine the reference slot as the third slot occurring after the first offset number of slots from the first slot comprises the one or more processors being configured to, individually or collectively, execute the computer-executable instructions to cause the apparatus to exclude slots, from the first slot, indicated in the slot configuration as FD slots from the first offset number of slots.

6. The apparatus of claim 1, wherein the one or more processors being configured to, individually or collectively, execute the computer-executable instructions to cause the apparatus to determine the reference slot as the third slot comprises the one or more processors being configured to, individually or collectively, execute the computer-executable instructions to cause the apparatus to determine a next slot after the first slot in which the DCI triggering the SRS resource set for the A-SRS transmission as the reference slot, excluding slots indicated in the slot configuration as FD slot.

7. The apparatus of claim 1, wherein the second offset number of available slots comprises one or more slots indicated in the slot configuration as FD slots.

8. The apparatus of claim 1, wherein the one or more processors are configured to, individually or collectively, execute the computer-executable instructions to cause the apparatus to determine a given slot as unavailable when the slot is indicated in the slot configuration as a downlink slot.

9. The apparatus of claim 1, wherein the apparatus is configured with a first frequency configuration to use for the SRS resource set for a slot indicated in the slot configuration as a half-duplex uplink slot and a second frequency configuration to use for the SRS resource set for a slot indicated in the slot configuration as a FD slot.

10. The apparatus of claim 1, wherein the one or more processors are configured to execute the computer-executable instructions to cause the apparatus to receive radio resource control (RRC) signaling configuring the first offset number of slots, the second offset number of available slots, and an SRS resource set configuration.

11. An apparatus of wireless communications by a network entity, the apparatus comprising:
memory comprising computer-executable instructions; and
one or more processors configured to, individually or collectively, execute the computer-executable instructions and cause the apparatus to:
output, in a first slot, downlink control information (DCI) triggering a sounding reference signal (SRS) resource set for an aperiodic sounding reference signal (A-SRS) transmission by a user equipment (UE);
determine a reference slot as a third slot occurring after a first offset number of slots from the first slot; and
determine a second slot to monitor the A-SRS transmission as a slot that is a second offset number of available slots after the reference slot, wherein a slot indicated in a slot configuration as a full-duplex (FD) slot is an available slot, of the number of available slots, when all SRS resources of the triggered SRS resource set fit within an uplink bandwidth of the FD slot, and wherein the FD slot is an unavailable slot when one or more of the SRS resources of the triggered SRS resource set do not fit within the uplink bandwidth of the FD slot.

12. The apparatus of claim 11, wherein the first offset number of slots comprises zero or more slots.

13. The apparatus of claim 11, wherein the one or more processors are configured to execute the computer-executable instructions to, individually or collectively, cause the apparatus to:
output, for configuring the UE, an indication of the first offset number of slots configuring the UE by radio resource control (RRC) signaling or dynamic signaling; and
indicate the second offset number of available slots in the DCI triggering the SRS resource set for the A-SRS transmission.

14. The apparatus of claim 11, wherein the one or more processors being configured to, individually or collectively, execute the computer-executable instructions to cause the apparatus to determine the reference slot as the third slot comprises the one or more processors being configured to, individually or collectively, execute the computer-executable instructions to cause the apparatus to determine the third slot as the first slot in which the DCI triggering the SRS resource set for the A-SRS transmission is output.

15. The apparatus of claim 11, wherein the one or more processors being configured to, individually or collectively, execute the computer-executable instructions to cause the apparatus to determine the reference slot as the third slot occurring after the first offset number of slots from the first slot comprises the one or more processors being configured to, individually or collectively, execute the computer-executable instructions to cause the apparatus to exclude slots, from the first slot, indicated in the slot configuration as FD slots from the first offset number of slots.

16. The apparatus of claim 11, wherein the one or more processors being configured to, individually or collectively, execute the computer-executable instructions to cause the apparatus to determine the reference slot as the third slot comprises the one or more processors being configured to, individually or collectively, execute the computer-executable instructions to cause the apparatus to determine a next slot after the first slot in which the DCI triggering the SRS resource set for the A-SRS transmission as the reference slot, excluding slots indicated in the slot configuration as FD slot.

17. The apparatus of claim 11, wherein the second offset number of available slots comprises one or more slots indicated in the slot configuration as FD slots.

18. The apparatus of claim 11, wherein the one or more processors are configured to, individually or collectively, execute the computer-executable instructions to cause the apparatus to determine a given slot as unavailable when the slot is indicated in the slot configuration as a downlink slot.

19. A method of wireless communications by a user equipment (UE), the method comprising:
- receiving, in a first slot, downlink control information (DCI) triggering a sounding reference signal (SRS) resource set for an aperiodic sounding reference signal (A-SRS) transmission;
- determining a reference slot as a third slot occurring after a first offset number of slots from the first slot; and
- determining a second slot to transmit the A-SRS as a slot that is a second offset number of available slots after the reference slot, wherein a slot indicated in a slot configuration as a full-duplex (FD) slot is an available slot, of the number of available slots, when all SRS resources of the triggered SRS resource set fit within an uplink bandwidth of the FD slot, and wherein the FD slot is an unavailable slot when one or more of the SRS resources of the triggered SRS resource set do not fit within the uplink bandwidth of the FD slot.

20. A method of wireless communications by a network entity, the method comprising:
- outputting, in a first slot, downlink control information (DCI) triggering a sounding reference signal (SRS) resource set for an aperiodic sounding reference signal (A-SRS) transmission by a user equipment (UE);
- determining a reference slot as a third slot occurring after a first offset number of slots from the first slot; and
- determining a second slot to monitor the A-SRS transmission as a slot that is a second offset number of available slots after the reference slot, wherein a slot indicated in a slot configuration as a full-duplex (FD) slot is an available slot, of the number of available slots, when all SRS resources of the triggered SRS resource set fit within an uplink bandwidth of the FD slot, and wherein the FD slot is an unavailable slot when one or more of the SRS resources of the triggered SRS resource set do not fit within the uplink bandwidth of the FD slot.

* * * * *